US012812471B1

(12) United States Patent
Tran et al.

(10) Patent No.: US 12,812,471 B1
(45) Date of Patent: Nov. 24, 2026

(54) DETECTING AND MERGING SYNCHRONIZED WIRELESS NETWORKS

(71) Applicant: Amazon Technologies, Inc., Seattle, WA (US)

(72) Inventors: Binh Tran, Mountain View, CA (US); Sunil Felix Assao, Livermore, CA (US); Jonathan Chan, Los Altos, CA (US); Kun-Ying Liu, San Jose, CA (US); Chiu Ngok Eric Wong, San Jose, CA (US); Haoran Xiao, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 304 days.

(21) Appl. No.: 18/472,783

(22) Filed: Sep. 22, 2023

(51) Int. Cl.
*H04W 28/088* (2023.01)
*H04W 16/14* (2009.01)
*H04W 72/0446* (2023.01)

(52) U.S. Cl.
CPC ......... *H04W 28/088* (2023.05); *H04W 16/14* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |

(Continued)

FOREIGN PATENT DOCUMENTS

| | | | |
|---|---|---|---|
| EP | 4354938 | A1 | 4/2024 |

OTHER PUBLICATIONS

Umer, Javed, et al., "Frequency hopping in IEEE 802.15. 4 to mitigate IEEE 802.11 interference and fading," Journal of Systems Engineering and Electronics, 29.3 (Jun. 2018): 445-455, URL: https://ieeexplore.ieee.org/stamp/stamp.jsp?tp=&arnumber=8406341.

(Continued)

*Primary Examiner* — Faruk Hamza
*Assistant Examiner* — Cassandra L Decker
(74) *Attorney, Agent, or Firm* — Athorus, PLLC

(57) ABSTRACT

Two or more synchronized wireless networks having root coordinators and any number of other nodes may merge in an orderly manner. Root coordinators of the synchronized wireless networks monitor for transmissions of beacons at selected intervals. Upon detecting a beacon transmitted by another root coordinator of another synchronized wireless network, a root coordinator determines a level of priority of that root coordinator or that network. If the other root coordinator or the other network has a higher level of priority, the root coordinator begins a merger process by transmitting beacons identifying the root coordinator or the other network. Coordinators receiving the beacon may determine whether they have any synchronized coordinators and, if not, may select a coordinator of the other network for synchronization and connection. A merger is complete when a root coordinator of one network synchronizes with and connects to a coordinator of the other network.

20 Claims, 19 Drawing Sheets

(56) References Cited

U.S. PATENT DOCUMENTS

| | | | |
|---|---|---|---|
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |
| 9,473,747 | B2 | 10/2016 | Kobres et al. |
| 11,039,342 | B1 | 6/2021 | Chung et al. |
| 2003/0002712 | A1 | 1/2003 | Steenburgh et al. |
| 2004/0181467 | A1 | 9/2004 | Raiyani et al. |
| 2004/0208152 | A1 | 10/2004 | Perkins et al. |
| 2005/0243765 | A1 | 11/2005 | Schrader et al. |
| 2006/0187866 | A1 | 8/2006 | Werb et al. |
| 2007/0025384 | A1* | 2/2007 | Ayyagari ............... H04B 3/542 370/445 |
| 2008/0055087 | A1 | 3/2008 | Horii et al. |
| 2008/0077511 | A1 | 3/2008 | Zimmerman |
| 2008/0109114 | A1 | 5/2008 | Orita et al. |
| 2008/0279155 | A1 | 11/2008 | Pratt, Jr. et al. |
| 2009/0121017 | A1 | 5/2009 | Cato et al. |
| 2009/0161637 | A1 | 6/2009 | Ruy et al. |
| 2009/0245573 | A1 | 10/2009 | Saptharishi et al. |
| 2010/0111050 | A1 | 5/2010 | Jeong |
| 2011/0011936 | A1 | 1/2011 | Morandi et al. |
| 2011/0202181 | A1 | 8/2011 | Lee et al. |
| 2012/0284132 | A1 | 11/2012 | Kim et al. |
| 2013/0076898 | A1 | 3/2013 | Philippe et al. |
| 2013/0253700 | A1 | 9/2013 | Carson et al. |
| 2014/0016581 | A1 | 1/2014 | Jeon et al. |
| 2014/0185574 | A1 | 7/2014 | Gruet et al. |
| 2014/0279294 | A1 | 9/2014 | Field-Darragh et al. |
| 2015/0019391 | A1 | 1/2015 | Kumar et al. |
| 2015/0073907 | A1 | 3/2015 | Purves et al. |
| 2016/0021017 | A1 | 1/2016 | Thubert et al. |
| 2016/0157176 | A1* | 6/2016 | Yu ............................ H04W 4/70 370/311 |
| 2016/0174192 | A1 | 6/2016 | Raghu et al. |
| 2016/0174218 | A1 | 6/2016 | Stanescu et al. |
| 2016/0330713 | A1 | 11/2016 | Vijayasankar |
| 2017/0325224 | A1 | 11/2017 | Shudark et al. |
| 2018/0027440 | A1* | 1/2018 | Sun ................... H04W 28/0215 370/236 |
| 2018/0109952 | A1 | 4/2018 | Abraham et al. |
| 2019/0037506 | A1 | 1/2019 | Singh et al. |
| 2019/0349786 | A1 | 11/2019 | Hett et al. |
| 2022/0240164 | A1 | 7/2022 | Hett et al. |
| 2022/0377793 | A1* | 11/2022 | Uhling ................ H04W 56/001 |
| 2023/0059363 | A1* | 2/2023 | Strater .................. H04W 24/02 |
| 2024/0089839 | A1* | 3/2024 | Bhat ................... H04W 72/542 |
| 2024/0365189 | A1* | 10/2024 | Fratti ................ H04W 36/0061 |

OTHER PUBLICATIONS

Watteyne, Thomas, Maria-Rita Palattella, and Luigi Alfredo Grieco, “Using IEEE 802.15. 4e Time-Slotted Channel Hopping (TSCH) in the internet of things (IoT): Problem Statement.” Internet Engineering Task Force (May 2015), Informational, 23 pages.

Abhaya Asthana et al., “An Indoor Wireless System for Personalized Shopping Assistance”, Proceedings of IEEE Workshop on Mobile Computing Systems and Applications, 1994, pp. 69-74, Publisher: IEEE Computer Society Press.

Cristian Pop, “Introduction to the BodyCom Technology”, Microchip AN1391, May 2, 2011, pp. 1-24, vol. AN1391, No. DS01391A, Publisher: 2011 Microchip Technology Inc.

* cited by examiner

ROOT COORDINATORS TRANSMIT BEACONS INCLUDING SCHEDULING INFORMATION AND MONITOR FOR BEACONS AT SELECTED INTERVALS

ENHANCED BEACON i TRANSMITTED BY COORDINATORS

ROOT COORDINATOR TRANSMITS BEACON REPORTING PRESENCE OF OTHER SYNCHRONIZED WIRELESS NETWORK AND MONITORS FOR OTHER BEACONS

COORDINATOR TRANSMITS BEACON REPORTING PRESENCE OF OTHER SYNCHRONIZED WIRELESS NETWORK AND MONITORS FOR OTHER BEACONS

COORDINATOR NODES WITHOUT CHILD COORDINATORS
JOIN OTHER SYNCHRONIZED WIRELESS NETWORK

ROOT COORDINATOR TRANSMITS BEACON REPORTING PRESENCE OF OTHER SYNCHRONIZED WIRELESS NETWORK AND MONITORS FOR OTHER BEACONS

COORDINATOR JOINS OTHER SYNCHRONIZED WIRELESS NETWORK AFTER CHILD COORDINATORS

ROOT COORDINATOR SYNCHRONIZES WITH COORDINATOR NODE OF OTHER SYNCHRONIZED WIRELESS NETWORK AFTER ALL COORDINATORS

SYNCHRONIZED WIRELESS NETWORKS

DETECTING AND MERGING SYNCHRONIZED WIRELESS NETWORKS

BACKGROUND

Time-slotted channel hopping (or "TSCH)," sometimes called time-synchronized channel hopping), is a medium access control ("MAC") that is intended to coordinate all transmissions of packets (e.g., data) between nodes of networks, such as personal area networks (or "PAN"). In some implementations, nodes of such networks may include systems or sensors of any type or form.

A network that operates according to TSCH may include multiple gateways or coordinators, with each gateway or coordinator in turn providing connectivity to a set of nodes (e.g., leaf nodes, outer nodes, terminal nodes, or others, which may include one or more devices such as sensors). Each of the gateways or coordinators and their respective nodes may comprise an individual PAN that is synchronized in time, and may adopt TSCH to enable access to channels. Each of the PANs formed by such gateways or coordinators may also be synchronized to a single coordinator, which may be called a "root coordinator," and may serve as a timing master for every other device of the PAN, including any number of other coordinators and nodes connected to such coordinators (e.g., sensors or other devices).

Synchronized wireless networks may be formed independently, e.g., according to any number of procedures or protocols, by which a root coordinator may transmit beacons including information elements identifying itself and attributes of its operations. Other coordinators that receive such beacons may then synchronize with the root coordinator, and transmit or receive beacons identifying themselves as such, along with attributes of their respective operations. When nodes (e.g., devices or systems, or other coordinators) receive a beacon transmitted by a coordinator, the nodes may synchronize with the coordinator, and a PAN is formed thereby.

Occasionally, when multiple synchronized wireless networks of devices or systems are formed within a facility, merging the synchronized wireless networks may enhance the efficiency and reliability of networked operations of the devices or systems within the facility, such as to avoid interference or other adverse effects.

DETAILED DESCRIPTION

As is set forth in greater detail below, the systems and methods of the present disclosure are directed to detecting and merging synchronized wireless networks, which may include one or more area networks, such as PANs. More specifically, the systems and methods disclosed herein are directed to root coordinators of synchronized wireless networks that are configured to scan for beacons transmitted by other root coordinators of other synchronized wireless networks at selected intervals of time, and to determine whether such synchronized wireless networks have higher levels of priority, e.g., based on ages of such networks, or numbers of slots that have elapsed since the networks were initially established and deployed. Upon determining that another synchronized wireless network has a higher level of priority, a root coordinator may generate and transmit a beacon informing any coordinators synchronized with the root coordinator, or connected to the root coordinator, of the presence of the other synchronized wireless network. The beacon transmitted by the root coordinator may include one or more values indicating the presence of one or more other networks, as well as one or more values indicating that the root coordinator is temporarily unavailable to receive data from any nodes of the synchronized wireless network. Other coordinators of the synchronized wireless network receiving the beacon may then either generate and transmit a beacon informing child coordinators of the presence of the other synchronized wireless network, and continue to scan for beacons transmitted by other root coordinators at selected intervals, or synchronize with the other root coordinator and connect to the other synchronized wireless network, where such coordinators do not have any child coordinator. In this manner, a root coordinator of one synchronized wireless network may coordinate a merger of the synchronized wireless network with any number of other synchronized wireless networks in an orderly fashion, thereby bringing nodes of all of the synchronized wireless networks together into a single, common network.

Figure 1A:
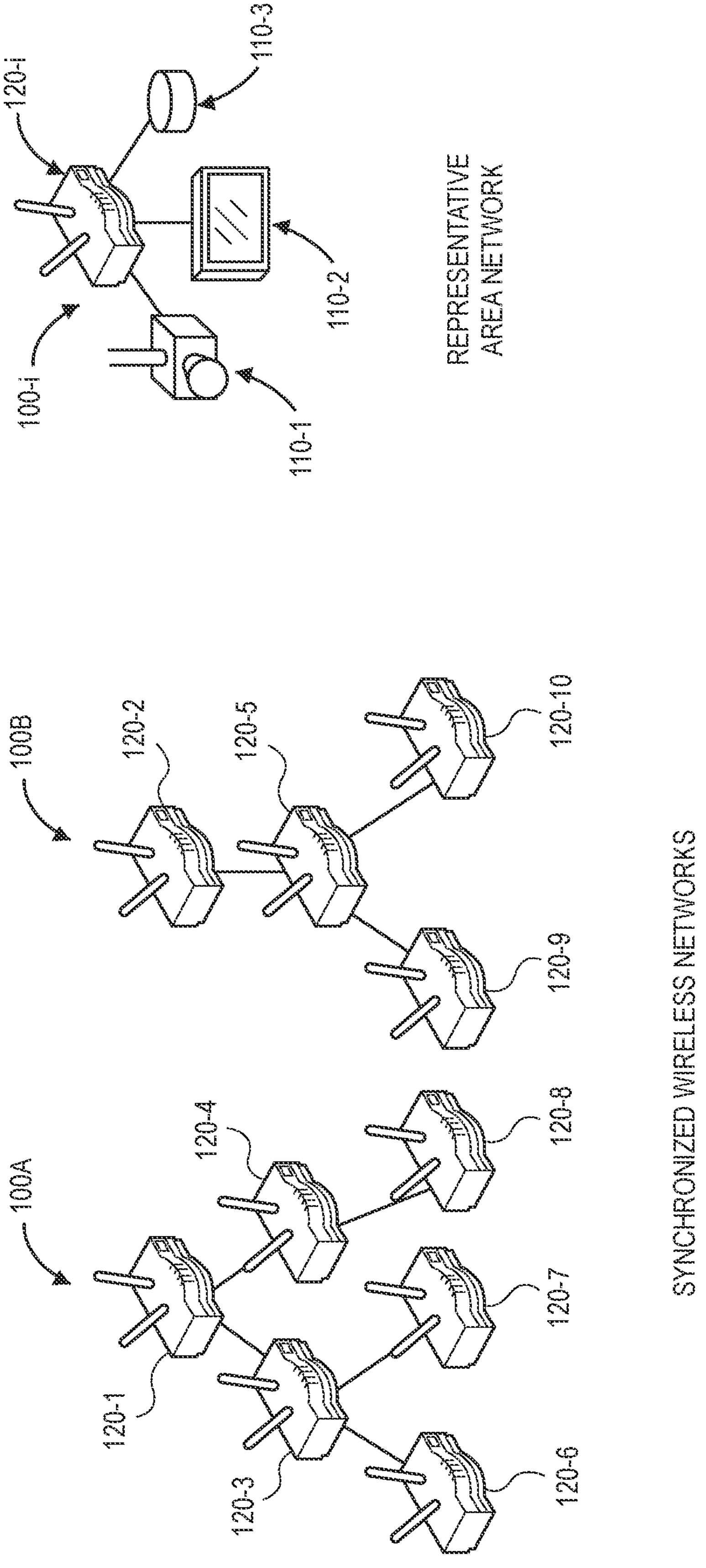
FIGS. 1A through 1I are views of aspects of one system for detecting or merging synchronized wireless networks in accordance with implementations of the present disclosure.

Referring to FIGS. 1A through 1I, views of aspects of one system for detecting or merging synchronized wireless networks in accordance with implementations of the present disclosure are shown. As is shown in FIG. 1A, a synchronous wireless network 100A and a synchronous wireless network 100B are each connected to and configured to communicate wirelessly with a plurality of other coordinators (or coordinator nodes, or gateway nodes). The synchronous wireless network 100A includes a root coordinator 120-1 and a pair of coordinator nodes 120-3, 120-4 synchronized with the root coordinator 120-1, as well as a pair of coordinator nodes 120-6, 120-7 synchronized with the coordinator node 120-3, and a coordinator node 120-8 synchronized with the coordinator node 120-4. The synchronous wireless network 100B includes a root coordinator 120-2, a coordinator node 120-5 synchronized with the root coordinator 120-2, and a pair of coordinator nodes 120-9, 120-10 synchronized with the coordinator node 120-5.

Each of the root coordinators 120-1, 120-2 may generate communication schedules for their respective synchronized wireless networks 100A, 100B to synchronize communication between or among nodes of the synchronized wireless networks 100A, 100B, and to promulgate such communication schedules to the respective nodes by the transmission of one or more beacons. Nodes of the synchronized wireless network networks 100A, 100B may communicate according to the IEEE 802.15.4 family of protocols, standards or specifications, or according to any other protocols, standards or specifications.

Each of the coordinator nodes 120-3, 120-4, 120-5, 120-6, 120-7, 120-8, 120-9, 120-10 may be a coordinator of an area network, e.g., a PAN, or a member of an area network. Each of the coordinator nodes 120-3, 120-4, 120-6, 120-7, 120-8 may monitor one or more channels designated for the transmission of one or more signals in communication schedules generated by the root coordinator 120-1, and each of the coordinator nodes 120-5, 120-9, 120-10 may monitor one or more channels designated for the transmission of one or more signals in communication schedules generated by the root coordinator 120-2. Each of the coordinator nodes 120-3, 120-4, 120-5, 120-6, 120-7, 120-8, 120-9, 120-10 may be further configured to generate a communication schedule for synchronizing communication between or among devices of a respective area network, and promulgate that communication schedule to such devices by the transmission of one or more beacons.

Each of the synchronized wireless networks 100A, 100B may include any number of area networks, which may include at least one coordinator node and any number of other nodes (e.g., "leaf" nodes), which may be devices or systems of any type or form, and may be connected to an area network of one of the coordinator nodes 120-1 through 120-10. For example, as is shown in FIG. 1A, a representative coordinator node 120-*i* of a representative area network 100-*i* is connected to one or more cameras (or other imaging devices) 110-1, one or more interactive displays 110-2, and one or more load sensors 110-3, or any other devices or systems (not shown). The cameras 110-1 may be configured to capture, process and/or store imaging data (e.g., visual images, depth images, or any other type of images) and, in some implementations, audio signals corresponding to the imaging data. The cameras 110-1 may be further configured to transmit imaging data to the representative coordinator node 120-*i*, or to one or more other monitors, stations or data stores (not shown) over one or more networks, e.g., by wired or wireless technologies or protocols. Alternatively, each of the cameras 110-1 may be configured to process imaging data according to one or more algorithms, methods or techniques (e.g., a machine learning model or tool), and to transfer information or data regarding the imaging data to representative coordinator node 120-*i*.

The interactive displays 110-2 (e.g., electronic shelf labels) may be configured to display any type or form of information or data regarding items, e.g., prices, identifiers of the items, or other information or data, which may be received from the representative coordinator node 120-*i*. The load sensors 110-3 may be configured for sensing normal loads (e.g., vertical loads) on a surface at discrete points, and may include one or more capacitive sensors, force-sensing resistors, strain gages, load cells, piezoelectric sensors, inductive weight sensors, or any other type or form of device or system for sensing a load thereon. Signals generated by such load sensors 110-3 may be transmitted to the representative coordinator node 120-*i* and interpreted to detect changes or variations in loading on a surface, and to determine a number of items, a type of the items, or a mass of one or more of the items, that are placed on or removed from the surface due to such changes or variations in loading.

Nodes or other components that are connected to the coordinator nodes 120-1 through 120-10 may be heterogeneous in nature, and need not have any attributes or features in common with any number of the other nodes or components connected thereto. Alternatively, nodes or other components that are connected to the coordinator nodes 120-1 through 120-10 may be homogenous in nature, such that each of the nodes or other components is identical or has one or more attributes or features in common with any number of other nodes or components connected thereto. Such devices or systems may also include one or more circuits or other components, and may be configured for communication by wired or wireless technologies or protocols. In some implementations, such devices or systems may be configured to generate and transmit signals corresponding to conditions sensed thereby at designated intervals, e.g., in one or more pulses rather than continuously, in order to reduce power or processing capacity consumed during operation. Additionally, in some implementations, such devices or systems may be self-powered, e.g., with one or more batteries or power sources provided therein.

Figure 1B:
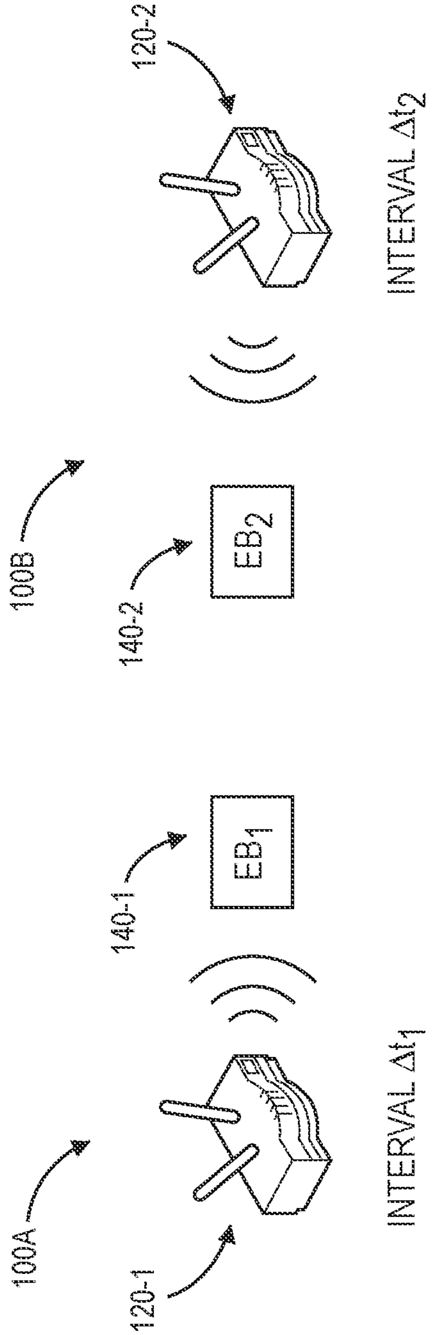

As is shown in FIG. 1B, the root coordinator 120-1 generates and transmits a beacon 140-1, e.g., an enhanced beacon, or $EB_1$, at a time $t_1$, in accordance with a channel offset and within a timeslot within a slotframe of a communication schedule (e.g., a channel-hopping schedule) established for the synchronized wireless network 100A by the root coordinator 120-1. Similarly, as is also shown in FIG. 1B, the root coordinator 120-2 generates and transmits a beacon 140-2, e.g., an enhanced beacon, or $EB_2$, at a time $t_2$, in accordance with a channel offset and within a timeslot within a slotframe of a communication schedule (e.g., a channel-hopping schedule) established for the synchronized wireless network 100B by the root coordinator 120-2.

As is further shown in FIG. 1B, the root coordinators 120-1, 120-2 also scan for beacons transmitted by other root coordinators, e.g., beacons transmitted by one another, or by any other root coordinators of any other synchronous wireless networks (not shown), at selected intervals of time $\Delta t_1$, $\Delta t_2$. In some implementations, the root coordinators 120-1, 120-2 may randomly select a channel, and continue to monitor that channel for at least a predetermined period of time. For example, the predetermined period of time may range between a duration of one timeslot and a duration defined by a product of a number of the plurality of channels, a number of the plurality of timeslots and the duration of one timeslot. In some implementations, the root coordinators 120-1, 120-2 may conclude a scan for beacons upon capturing a beacon or a timeout, which may occur if a beacon is not detected from another root coordinator within the predetermined period of time, e.g., after approximately sixty-four seconds. Alternatively, the root coordinators 120-1, 120-2 may scan for beacons for any other period of time.

The beacons 140-1, 140-2 may include any information (e.g., any number of information elements) regarding synchronization, channel hopping, or timeslots that are available or scheduled to be utilized by the root coordinators 120-1, 120-2. The timeslots during which the beacons 140-1, 140-2 are transmitted may have any duration, such as fifteen milliseconds (15 ms) or any other duration. Additionally, the timeslot of the communication schedule may include any number of channels or channel offsets, such as eight (8), sixteen (16), thirty-two (32), or sixty-four (64), or any other number of channels.

The beacons 140-1, 140-2 may be transmitted by the root coordinators 120-1, 120-2 in accordance with communication schedules established for the synchronized wireless networks 100A, 100B. Contents of the beacons 140-1, 140-2 may be interpreted by the coordinator nodes 120-3 through 120-10 or nodes of the synchronous wireless networks 100A, 100B, which may process the beacons 140-1, 140-2 to identify timeslots of a slotframe that are available for communication, e.g., for transmitting or receiving information or data, and timeslots of the slotframe during which the coordinator nodes 120-3 through 120-10 may expect to receive information or data from the root coordinators 120-1, 120-2, including but not limited to one or more other beacons. Additionally, the beacons 140-1, 140-2 may also advertise the synchronized wireless networks 100A, 100B or the communication schedules thereof to devices that are not associated or synchronized with either of the synchronized wireless networks 100A, 100B, such as any number of unconnected devices or systems (not shown).

Figure 1C:
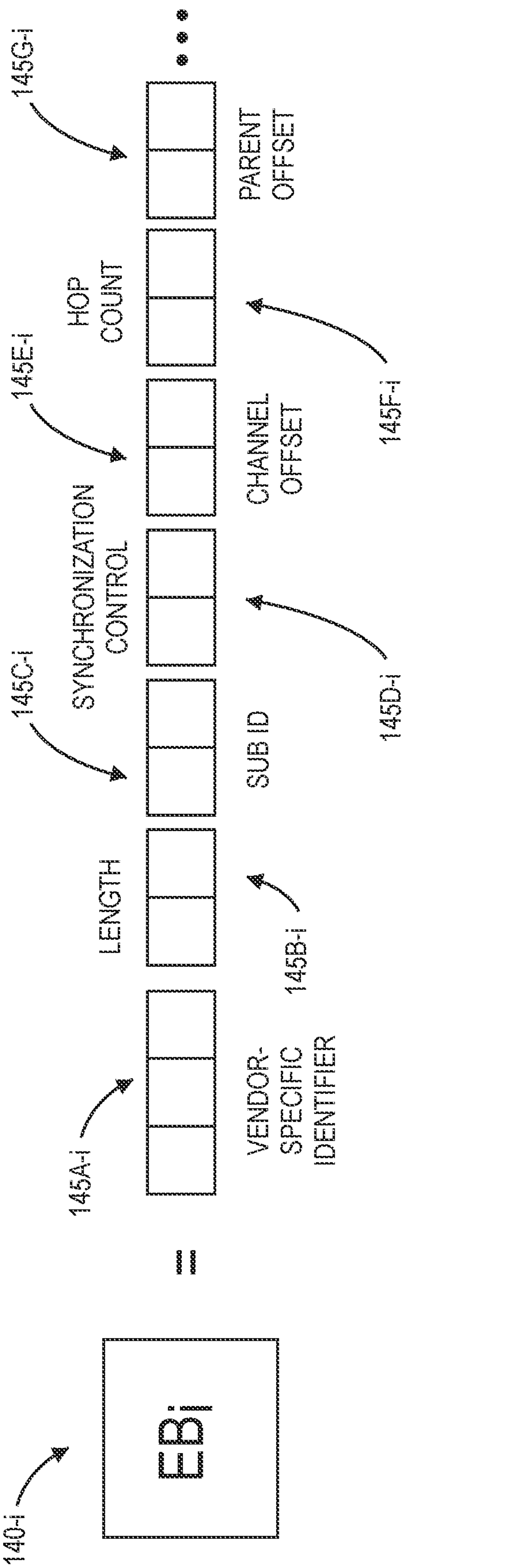

Each of the beacons 140-1, 140-2 may include any number of information elements regarding synchronization, channel hopping, or timeslots of a slotframe that are utilized by the root coordinators 120-1, 120-2, including but not limited to information elements regarding communication schedules for the synchronous wireless networks 100A, 100B according to a beacon interval, or a superframe having any number of beacon intervals. For example, as is shown in FIG. 1C, a representative beacon 140-*i* of the beacons 140-1, 140-2 may include an information element 145A-i representing a specific identifier of a vendor (or another entity), such that devices or systems that are manufactured by or otherwise associated with the vendor (or entity) and receive the beacon 140-*i* may elect to join one of the synchronous wireless networks 100A, 100B based on the presence of the information element 145A-i within the beacon 140-*i*. Additionally, the beacon 140-*i* may further include an information element 145B-i identifying a length of the beacon 140-*i*, e.g., a period or a number of timeslots of a slotframe during which a coordinator may transmit frames, such as routing protocol frames or information objects identifying node ranks or priorities within the synchronous wireless networks 100A, 100B.

The beacon 140-*i* may also include an information element 145C-i representing an identifier of the coordinator that transmitted the beacon 140-*i*, e.g., a sub-id field. The beacon 140-*i* may further include an information element 145D-i identifying a synchronization control field, which may include one or more control fields including data regarding operation of an area network represented in a synchronization tree, or multiple area networks that have been synchronized to operate with one another. For example, in some implementations, the information element 145D-i may include a field including one bit for denoting whether a coordinator that transmitted the beacon 140-*i* is prepared or capable of participating in an area network represented in a synchronization tree, e.g., with one of two binary values indicating that the coordinator that transmitted the beacon 140-*i* is prepared or capable, or is unprepared or incapable, of participating in the area network. Alternatively, or additionally, the information element 145D-i may further include any number of other data fields regarding the operation of an area network represented in a synchronization tree.

The beacon 140-*i* may further include an information element 145E-i identifying a channel offset of a coordinator that transmitted the beacon 140-*i*. The channel offset identified in the information element 145E-i represents a difference between a channel utilized by the coordinator that transmitted the beacon 140-*i*, and channels operated by any of the other participants in an area network represented in a synchronization tree. The channel offset identified in the information element 145E-i may be selected at random or on any other basis, e.g., by one or more algorithms or techniques.

The beacon 140-*i* may also include an information element 145F-i identifying a hop count (or a synchronization hop count) of the coordinator that transmitted the beacon 140-*i*. The hop count represents a number of devices (e.g., coordinators) that the coordinator that transmitted the beacon 140-*i* is removed from a root coordinator of an area network represented in a synchronization tree, e.g., a synchronized wireless network. For example, a root coordinator of a synchronized wireless network has a hop count of zero, while coordinators that are directly connected to the root coordinator have hop counts of one. Likewise, a hop count of any node connected to the coordinator that transmitted the beacon 140-*i* is equal to the hop count of that coordinator, plus one. For example, where a coordinator has a hop count of one, a coordinator that is connected to and synchronized with that coordinator has a hop count of two. Alternatively, or additionally, the information element 145F-i, or other information elements of the beacon 140-*i*, may identify not only the hop count but also loading, speeds, reliability, latencies, or other factors associated with the operation of an area network represented in a synchronization tree.

The beacon 140-*i* may further include an information element 145G-i identifying a parent offset of the coordinator that transmitted the beacon 140-*i*. The parent offset is a channel offset of a parent to the coordinator that transmitted the beacon 140-*i*.

Alternatively, or additionally, the beacon 140-*i* may further include any number of other information elements, which may identify or represent multicast access periods, contention access periods, loading, epoch times, operating modes, or other attributes or features of the coordinator that transmitted the beacon 140-*i*. Alternatively, or additionally, the beacon 140-*i* may also include any number of information elements describing any other attributes or aspects of an enhanced beacon interval, or a superframe including any number of enhanced beacon intervals. Moreover, information regarding a communication schedule may be communicated with nodes of a network in any manner other than by transmission and receipt of beacons.

Thus, upon receiving beacons 140-1, 140-2 transmitted by one another, such as is shown in FIG. 1B, or by other coordinators of the synchronized wireless networks 100A, 100B, the root coordinators 120-1, 120-2 may process the beacons 140-1, 140-2 and take any number of actions upon interpreting the contents of such beacons 140-1, 140-2. For example, where the root coordinator 120-1 receives the beacon 140-2 transmitted by the root coordinator 120-2, the root coordinator 120-1 interprets the beacon 140-2 to determine the parent offset (viz., zero) of the root coordinator 120-2, a channel offset of the root coordinator 120-2, a hop count (viz., zero) of the root coordinator 120-2, a number of devices connected to the root coordinator 120-2, and any other information or data regarding the root coordinator 120-2 based on contents of the beacon 140-2. Similarly, the root coordinator 120-1 may also receive beacons transmitted by the other coordinators of the synchronized wireless network 100B, and determine parent offsets, channel offsets, hop counts, or numbers of devices or other information or data regarding such other coordinators based on contents of such beacons. From the beacon 140-2, and any other beacons received from coordinators of the synchronous wireless network 100B, the root coordinator 120-1 or any other coordinators may effectively construct a synchronous tree representing the synchronous wireless network 100B.

Similarly, upon receiving the beacon 140-1 from the root coordinator 120-1, and any other beacons generated or transmitted by coordinators of the synchronized wireless network 100A, the root coordinator 120-2 or any other coordinators may effectively construct a synchronous tree representing the synchronous wireless network 100A.

A level of priority of a synchronous wireless network may be determined in any manner. In some implementations, a level of priority of a synchronous wireless network may be represented in one or more bits of a beacon transmitted by a root coordinator. For example, a beacon may include one or more bits indicating an absolute slot number of a synchronized wireless network, or a total number of timeslots elapsed since the synchronized wireless network was initially deployed. The absolute slot number may thus indicate an age of the synchronized wireless network, and may be used as a basis for determining or establishing a level of priority of the synchronized wireless network. A beacon may also include one or more bits indicating a number of coordinators synchronized with a coordinator that transmitted the beacon, or a number of nodes (e.g., sensors or other leaf nodes) connected to the coordinator. The number of coordinators or the number of sensors may be used as a basis for determining or establishing a level of priority of the synchronized wireless network. In some implementations, a level of priority may be determined based on any number of factors, e.g., an absolute slot number, a number of coordinators or a number of nodes, either collectively or individually, and any of such factors may act as a tiebreaker or secondary basis for any other factor.

Alternatively, a level of priority of the synchronized wireless network may be determined on any basis other than an absolute slot number of the synchronized wireless network, numbers of coordinators synchronized with a coordinator, or a number of nodes connected to such coordinators, or in any manner other than values of beacons transmitted by coordinators.

Upon receiving the beacon 140-1 from the root coordinator 120-1 as shown in FIG. 1B, the root coordinator 120-2 determines that the synchronized wireless network 100A has a higher level of priority than the synchronized wireless network 100B, and may initiate a merger of the synchronized wireless network 100B with the synchronized wireless network 100A.

Figure 1D:
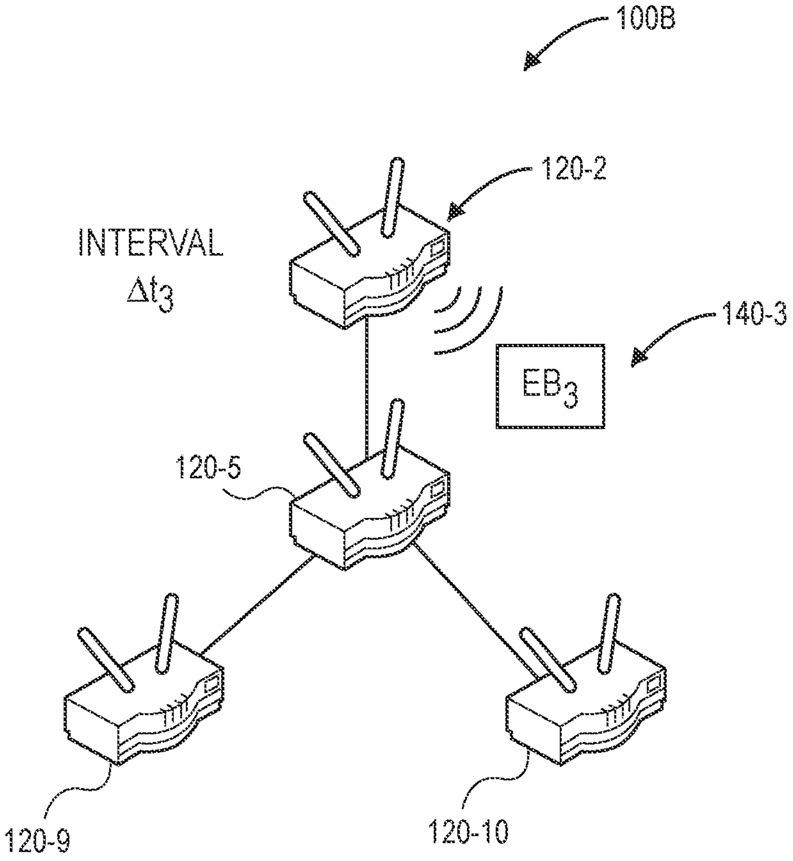

For example, as is shown in FIG. 1D, the root coordinator 120-2 generates and transmits a beacon 140-3, or $EB_3$. The beacon 140-3 includes one or more information elements reporting the presence of the other synchronized network 100A. For example, the information elements may include one or more bits or values, such as a “multi-trees” bit, which may have a binary value (e.g., zero or one) indicating that one or more other higher-priority synchronized wireless networks have been detected, or have not been detected. Alternatively, the beacon may include any other information elements or other features for informing nodes receiving the beacon that other root coordinators or synchronized wireless networks are present. Moreover, in some implementations, the “multi-trees” bit may indicate a number of the other root coordinators or synchronized wireless networks that are present.

Additionally, the root coordinator 120-2 may further continue to scan for beacons transmitted by any other root coordinators or any other coordinators of any other synchronized wireless networks (not shown) at a selected interval of time $\Delta t_3$, which may be selected on any basis. For example, the interval of time $\Delta t_3$ may be the same as the interval of time $\Delta t_2$ at which the root coordinator 120-2 scanned for beacons of other root coordinators, as is shown in FIG. 1B, or a different interval of time. In some implementations, the interval of time $\Delta t_3$ may be selected based on a number of nodes of the synchronized wireless network 100B, in order to provide such nodes with sufficient time to detect and synchronize with the root coordinator 120-1 or connect to the synchronized wireless network 100A.

Where the root coordinator 120-2 scans for beacons at the interval of time $\Delta t_3$, the root coordinator 120-2 also informs other nodes of the synchronized wireless network 100B that the root coordinator 120-2 will be unavailable for communication with such nodes, such as the transmission of information or data to such nodes or the receipt of information or data from such nodes, with the exception of the transmission of beacons, e.g., the beacon 140-3. For example, in some implementations, the beacon 140-3 may include one or more information elements including an “absent” bit having a binary value (e.g., zero or one) indicating that the coordinator is available or unavailable for communication other than the transmission of beacons, e.g., within a synchronization control field.

Figure 1E:
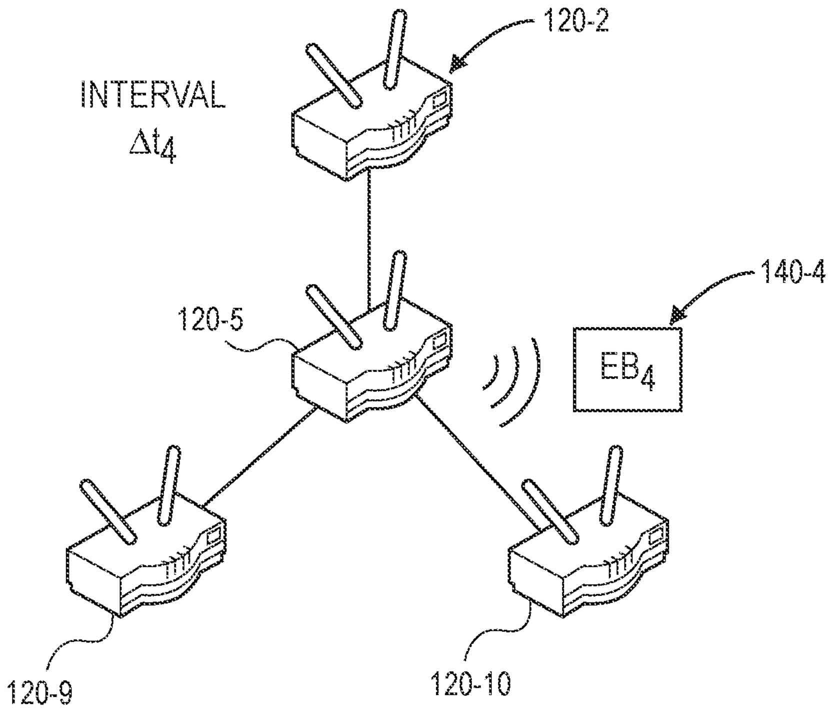

As is shown in FIG. 1E, after having received the beacon 140-3, the coordinator node 120-5, which is synchronized with the root coordinator 120-2, determines that it remains synchronized with and connected to the coordinator nodes 120-9, 120-10. The coordinator node 120-5 then generates and transmits a beacon 140-4, or $EB_4$. The beacon 140-4 also includes one or more information elements reporting the presence of the other synchronized network 100A, e.g., a “multi-trees” bit. The coordinator node 120-5 continues to scan for beacons transmitted by any other root coordinators (not shown) at a selected interval of time $\Delta t_4$, which may be the same as the interval of time $\Delta t_3$, or a different interval of time, and may be selected on any basis. For example, in some implementations, the interval of time $\Delta t_4$ may be selected based on a number of nodes of the synchronized wireless network 100B that are synchronized with or connected to the coordinator node 120-5. The beacon 140-4 may further inform any other nodes of the synchronized wireless network 100B that the coordinator node 120-5 will be unavailable for communication with such nodes, such as by the transmission of information or data to such nodes or the receipt of information or data from such nodes, with the exception of the transmission of beacons, e.g., the beacon 140-4. For example, in some implementations, the beacon 140-4 may include one or more information elements including bits indicating that the coordinator is unavailable for communication other than the transmission of beacons, e.g., an “absent” bit within a synchronization control field.

Figure 1F:
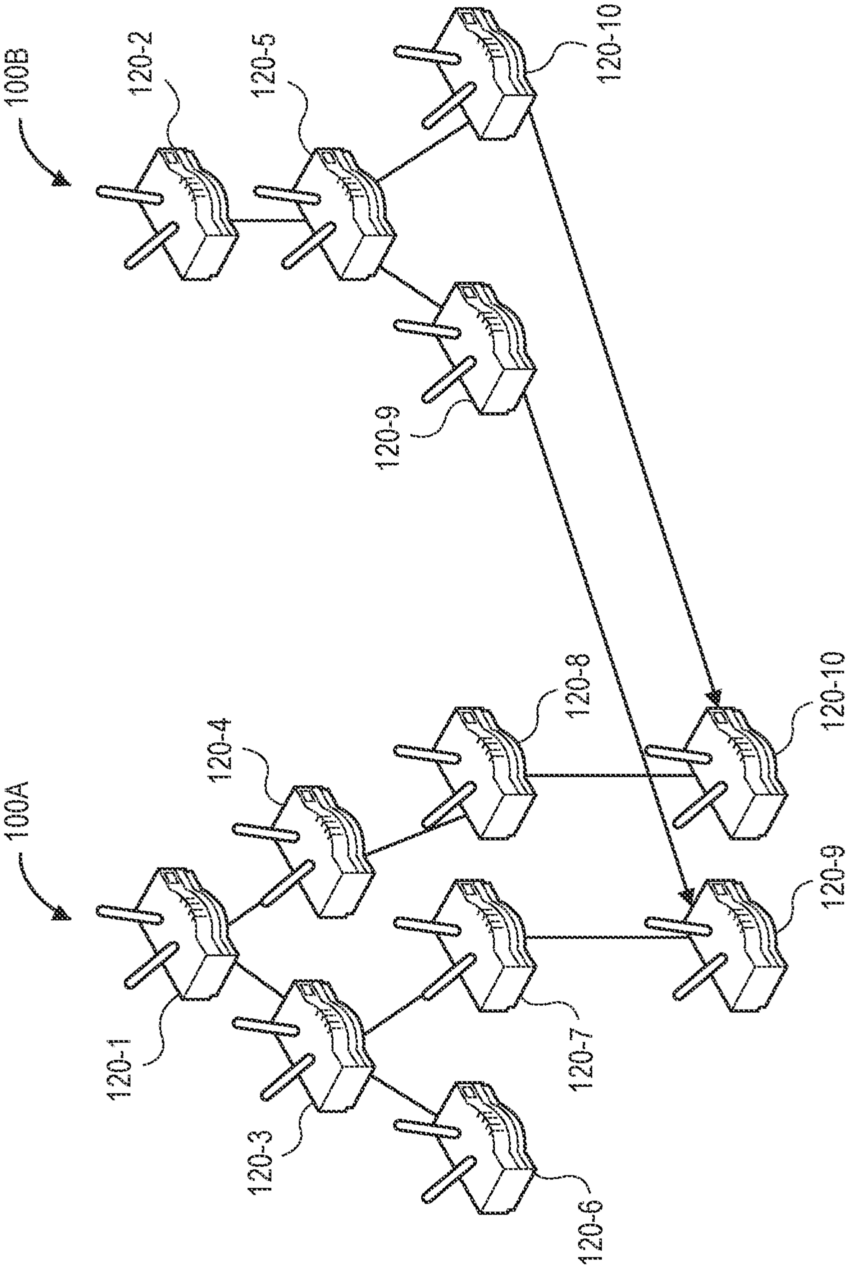

As is shown in FIG. 1F, upon receiving the beacon 140-4 from the coordinator node 120-5, the coordinator nodes 120-9, 120-10 determine that they do not have any child coordinator nodes, and are not synchronized with or connected to any coordinator nodes other than the coordinator node 120-5. Subsequently, the coordinator nodes 120-9, 120-10 may select one of the coordinator nodes of the synchronized wireless network 100A and synchronize with the selected one of the coordinator nodes before completing any number of authentication, authorization or security protocols, as necessary, prior to joining the synchronized wireless network 100A. For example, as is shown in FIG. 1F, the coordinator node 120-9 synchronizes with and connects to the coordinator node 120-7 of the synchronized wireless network 100A, and the coordinator node 120-10 synchronizes with and connects to the coordinator node 120-8 of the synchronized wireless network 100A. Alternatively, the coordinator nodes 120-9, 120-10 may select any other coordinator nodes of the synchronized wireless network 100A, and synchronize with and connect to such coordinator nodes.

Figure 1G:
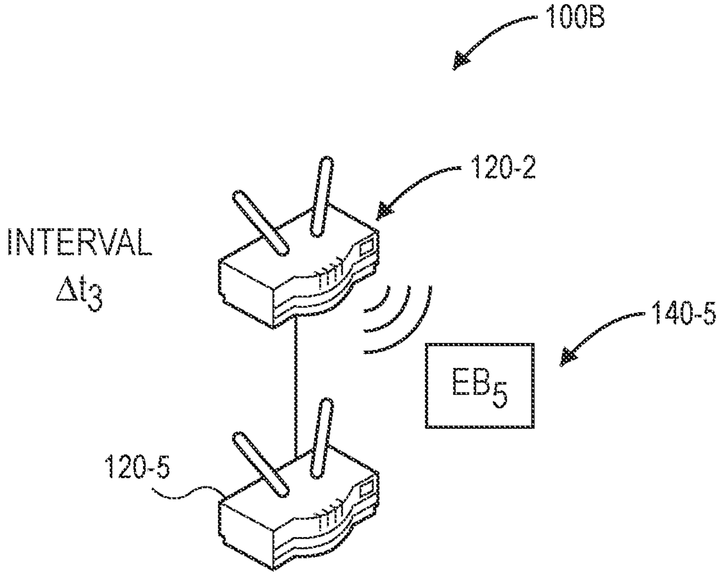

As is shown in FIG. 1G, the root coordinator 120-2 generates and transmits a beacon 140-5, or $EB_5$, including one or more information elements reporting the presence of the other synchronized network 100A, such as a “multi-trees” bit, indicating that one or more other higher-priority synchronized wireless networks have been detected. The beacon 140-5 may also include one or more information elements including bits indicating that the coordinator is unavailable for communication other than the transmission of beacons, e.g., an "absent" bit within a synchronization control field.

Additionally, as is also shown in FIG. 1G, the root coordinator 120-2 may further continue to scan for beacons transmitted by any other root coordinators (not shown) at the interval of time $\Delta t_3$. Alternatively, the root coordinator 120-2 may continue to scan for beacons at a different interval of time.

Figure 1H:
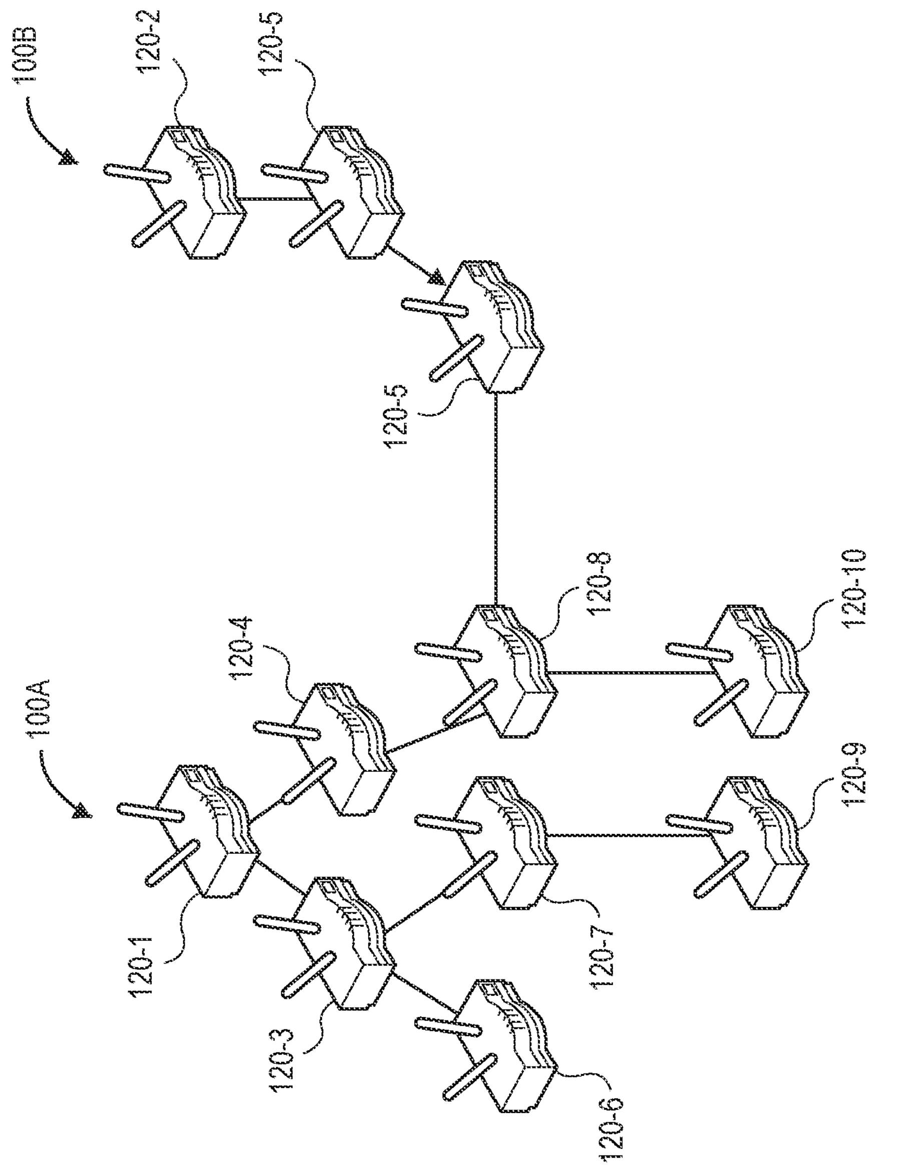

As is shown in FIG. 1H, upon receiving the beacon 140-5 from the root coordinator 120-2, the coordinator node 120-5 determines that it is no longer synchronized with the coordinator nodes 120-9, 120-10, and does not have any child coordinator nodes. Subsequently, the coordinator node 120-5 may select one of the coordinator nodes of the synchronized wireless network 100A, e.g., the coordinator node 120-8, and synchronize with the selected one of the coordinator nodes before completing any number of authentication, authorization or security protocols, as necessary, prior to joining the synchronized wireless network 100A.

Figure 1I:
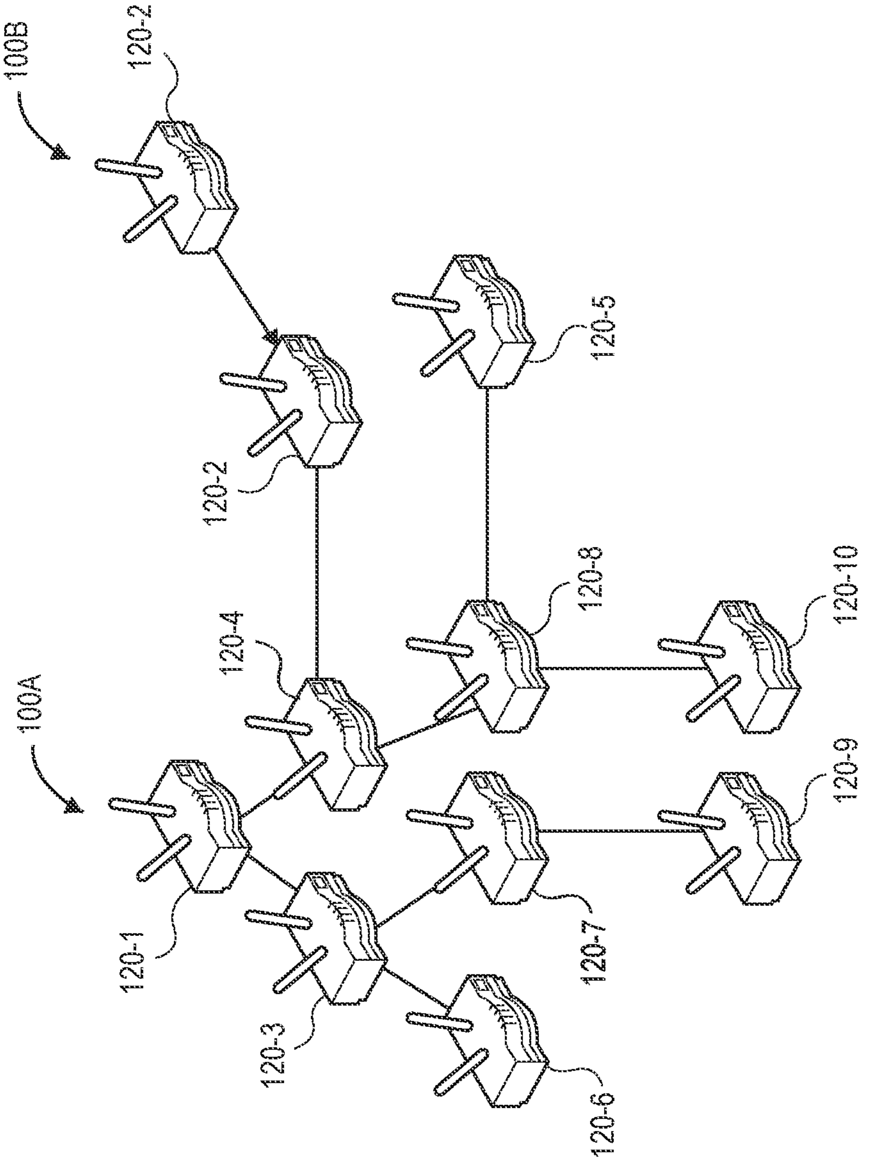

As is shown in FIG. 1I, the root coordinator 120-2, determines that it is no longer synchronized with any other coordinator nodes. Subsequently, the root coordinator 120-2 may select one of the coordinator nodes of the synchronized wireless network 100A, e.g., the coordinator node 120-4, and synchronize with the selected one of the coordinator nodes before completing any number of authentication, authorization or security protocols, as necessary, prior to joining the synchronized wireless network 100A. The root coordinator 120-2 may act as a coordinator node of an area network, and advertise its availability as such to any nodes within an operational range, but need not serve as a root coordinator of the synchronized wireless network 100A. Once the root coordinator 120-2 has joined the synchronized wireless network 100A, the merger of the synchronized wireless network 100B into the synchronized wireless network 100A is deemed complete.

In some implementations, nodes (e.g., coordinators but also other devices or systems, which may be called "leaf nodes") described herein may be equipped with one or more processors, components, transceivers, sensors or other systems for engaging in communications with other nodes, and with any other external computer devices via one or more other networks. For example, nodes may each include any number of transceivers or other systems for communicating via any wired or wireless protocols, standards or specifications, including but not limited to Wireless Fidelity ("Wi-Fi"), near-field communication (or "NFC"), Bluetooth®, or any other type of protocols, standards or specifications.

In some implementations, each of the devices or systems of an area network, e.g., a PAN, may be configured to operate according to the IEEE 802.15.4 family of protocols, standards or specifications. Additionally, nodes (e.g., coordinator nodes, or leaf nodes) that are connected to area networks may be homogenous or heterogeneous in nature, such that each of the nodes of an area network may have one or more attributes or features in common with any number of other nodes of the area network, or need not have any attributes or features in common with any number of the other nodes.

Time-slotted channel hopping, or TSCH, is a medium access control technique that relies on time synchronization to achieve low power operations and channel hopping for enhanced reliability. When an area network operates based on TSCH, activities of each node in the area network are controlled according to a time-slotted schedule in which time is carved into timeslots (or slot offsets) that are grouped into slotframes that repeat over time, and in which frequencies are divided into channels (or channel offsets). The schedule may be represented as a matrix or another set of cells, with each of the cells lying at an intersection of one timeslot and one channel.

Each of the timeslots is sufficiently long to accommodate a transmission of data and also a receipt of an acknowledgement, as well as encryption or decryption of the data, where necessary. The timeslots may have any duration or width. In some implementations, each of the timeslots may have a duration of approximately fifteen milliseconds (15 ms). Moreover, each of the timeslots is further identified with respect to a slot offset, e.g., an interval of time within a slotframe when the timeslot occurs, as well as a channel offset, e.g., an identification of a frequency for communication. A size of a slotframe is defined by a number of timeslots included therein. In some implementations, a slotframe may include approximately sixty to seventy timeslots. Timeslots may be dedicated to a single node or shared by two or more nodes. The channel hopping nature of a communication schedule in TSCH permits the same timeslot in a slotframe to be utilized for the transfer of data at a different frequency in each iteration of the slotframe.

Nodes of area networks may be configured to communicate within channels that have any range of frequencies. In some implementations, the channels may be provided within a band centered around a frequency within a range of frequencies between approximately nine hundred megahertz and approximately nine hundred fifty megahertz (900-950 MHz), between approximately nine hundred two megahertz and approximately nine hundred twenty-eight megahertz (902-928 MHz), between approximately eight hundred fifty megahertz and approximately eight hundred seventy-five megahertz (850-875 MHz), or between approximately eight hundred sixty-three megahertz and approximately eight hundred seventy megahertz (863-870 MHz). In some other implementations, the channels may be provided within a band centered around a frequency of approximately 2.4 gigahertz (GHz).

An area network, such as a PAN, is formed when a node, e.g., a coordinator node, or a gateway node, transmits a beacon (or a beacon frame) of information in a process known as advertising. The beacon may include any information regarding synchronization, channel hopping, or timeslots that are utilized by the area network being advertised. Other nodes that intend to connect with the coordinator may actively or passively scan one or more of a predetermined set of channels over a period of time in order to determine whether any beacons are being transmitted by nodes (e.g., the coordinator, or synchronizers) within such channels. Upon receiving a beacon transmitted by a node of an area network, the node may request to join the area network by synchronizing with one or more nodes of the area network, and operating in accordance with a communication schedule identified in the beacon. Once a node joins an area network, the node may communicate with other nodes of the network through one or more scheduled slotframes, and becomes a synchronizer that continuously advertises the area network to other nodes by transmitting beacons.

The nodes (e.g., devices or systems, including but not limited to coordinators) of the present disclosure may be mounted on walls, ceilings, roofs or other surfaces or structures of any type or form of facility, such as in locations within an operational range or communications range of one or more other nodes. For example, one or more nodes may be provided in association with any working area or environment, building, region, structure or other space (e.g., covered or uncovered) where access to one or more networks may be desired, such as a business-related structure such as an office, a shopping center, a restaurant (e.g., a coffee shop), a materials handling facility, a post office, a grocery store, a department store, or any other defined or undefined structure having one or more commercial areas. Alternatively, one or more nodes may be provided in association with a home of any type, kind, shape or form (e.g., a house, an apartment, a condominium, a dormitory, or any other defined or undefined structure having one or more living spaces), as well as indoor or outdoor forums or facilities such as stadiums, ballfields, parks (or other open spaces), transportation centers or financial institutions (e.g., banks).

Furthermore, a node may be configured to connect with any number of networks (e.g., the Internet) by any wired or wireless connections, and in accordance with any protocols, standards or specifications. For example, in some implementations, a node may be configured to communicate by way of any Institute of Electrical and Electronics Engineers (or "IEEE") standards, including but not limited to any of the IEEE 802 family of protocols, standards or specifications, and more specifically any of the IEEE 802.15 protocols, standards or specifications, viz., the IEEE 802.15.4 protocol.

Nodes of any other type or form may synchronize with other nodes to form area networks in such working areas or environments. Such other nodes may include any type or form of device, such as any number of sensors, cameras, load sensors, acoustic sensors (e.g., microphones), or any other sensors, as well as general-purpose or special-purpose machines such as personal computing devices (e.g., desktop computers, laptop computers, mobile devices, smartphones, tablets or smart speakers), as well as appliances or systems such as televisions, set-top boxes, audio or video equipment, refrigerators, ovens, telephones, garage door openers, security systems, lights, switches, locks, or others.

Figure 2:
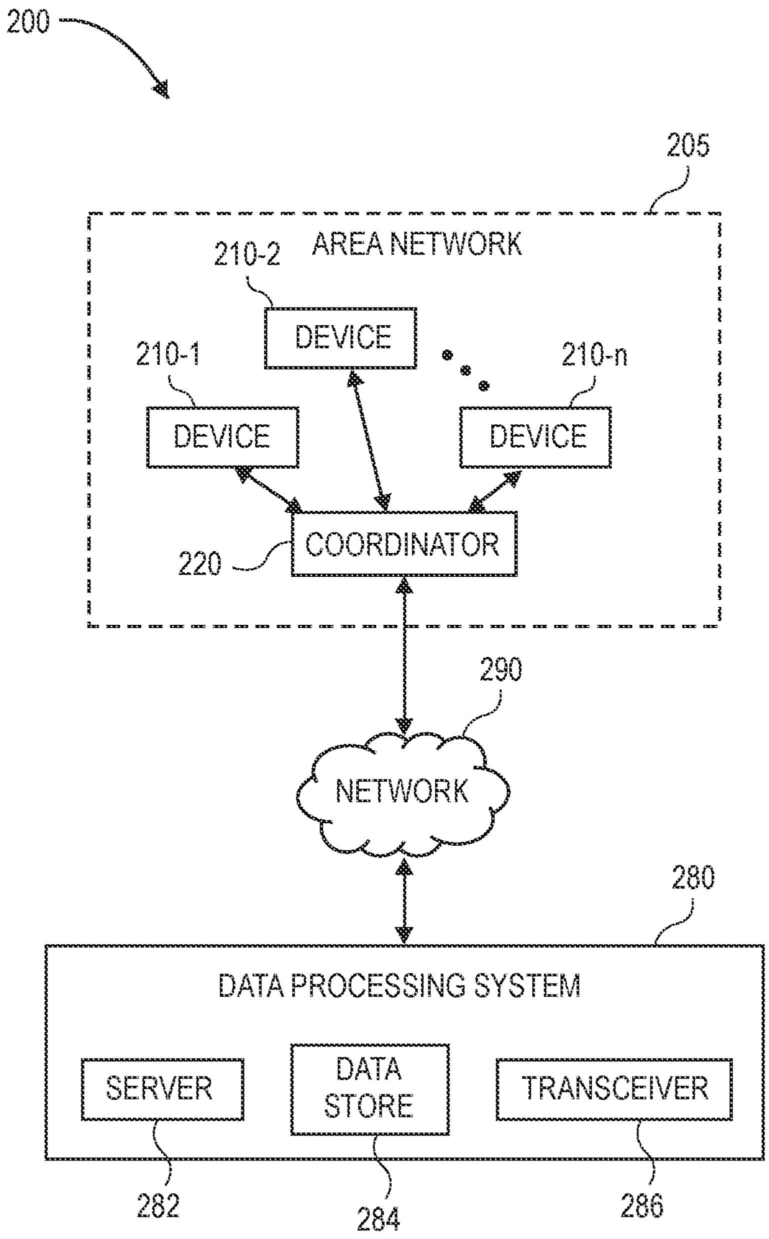
FIG. 2 is a block diagram of one system for detecting or merging synchronized wireless networks in accordance with implementations of the present disclosure.

Referring to FIG. 2, block diagrams of one system 200 for detecting or merging synchronized wireless networks in accordance with implementations of the present disclosure are shown. The system 200 includes an area network (e.g., a personal area network, or PAN) 205 and an external network 290. The area network 205 includes a plurality of devices 210-1, 210-2 . . . **210-*n* and a coordinator (e.g., a coordinator node, or a gateway node) 220. Except where otherwise noted, reference numerals preceded by the number "2" in FIG. 2 refer to elements that are similar to elements having reference numerals preceded by the number "1" shown in FIGS. 1A through 1**I.

The coordinator 220 is configured to associate with any or all of the devices 210-1, 210-2 . . . **210-*n*, and to enable such devices 210-1, 210-2 . . . 210-*n* to communicate with one or more external computer devices or systems, e.g., the data processing system 280 or others (not shown), over the external network 290**, which may include the Internet in whole or in part.

In some embodiments, the coordinator 220 may be a wireless router, a "hot spot," an antenna system, or any other device or component that is configured to enable communication over the external network 290. The coordinator 220 may include one or more processors, one or more data stores (or memory components), one or more transceivers and one or more antenna modules or any other components. In some implementations, one or more of the components of the coordinator 220 may be provided on a circuit board or card, e.g., a network interface card.

The processors of the coordinator 220 may be configured to execute one or more sets of instructions, which may be stored in one or more data stores or elsewhere, for causing the coordinator 220 to perform any of the functions or operations described herein. In some implementations, the processors of the coordinator 220 may generate communication schedules, or frequency plans, for communication with the area network 205, or other area networks (not shown), including cells that are scheduled or unscheduled and may be defined by channels (or channel offsets) and timeslots (or slot offsets). In some other implementations, the processors of the coordinator 220 may generate beacons, e.g., enhanced beacons, that advertise the area network 205 and include information regarding the communication schedules, as well as information regarding synchronization, channel hopping, or timeslots that are utilized by the area network 205. Alternatively, or additionally, any of the devices 210-1, 210-2 . . . **210-*n*** may likewise generate such beacons or other information.

Additionally, in some implementations, the processors may generate one or more frames of data corresponding to an authentication response or an association response, and cause such frames of data to be transmitted by the transceivers of the coordinator 220, as necessary. In some other implementations, however, the processors may interpret one or more frames of data, which may correspond to an authentication request, or an association request, as necessary.

The transceivers of the coordinator 220 may be configured to enable the coordinator 220 to receive or transmit information or data to or from the data processing system 280, or any other computing device, over the external network 290. For example, the transceivers of the coordinator 220 may be configured to communicate through one or more wired or wireless means, e.g., wired technologies such as Universal Serial Bus (or "USB") or fiber optic cable, or standard wireless protocols, standards or specifications such as Bluetooth® or any Wi-Fi protocol, such as over the external network 290 or directly. The transceivers of the coordinator 220 may also be configured to enable the coordinator 220 to communicate with any of the devices 210-1, 210-2 . . . **210-*n*** or any other devices or PANs (not shown), according to any wireless protocols, standards or specifications such as a Bluetooth® or Wi-Fi protocol. For example, the transceivers may be configured to communicate according to the 802.15.4 family of protocols, standards or specifications for communications over one or more networks (e.g., personal area networks). The transceivers may perform any necessary protocol, timing or other data transformations in order to convert data signals from a first format suitable for use by one component into a second format suitable for use by another component. In some implementations, the transceivers may include support for devices attached through various types of peripheral buses, e.g., variants of the Peripheral Component Interconnect ("PCI") bus standard or the Universal Serial Bus ("USB") standard. In some other implementations, functions of the transceivers may be split into two or more separate components, or incorporated directly into the processors. Additionally, the transceivers may be configured to operate or perform any type of encryption and on any basis.

The antenna modules of the coordinator 220 may be one or more components for transmitting or receiving information or data to or from the devices 210-1, 210-2 . . . **210-*n*, or to or from one or more other components or systems, e.g., over the external network 290** or directly. For example, the antenna modules may be configured to transmit one or more signals in any direction (e.g., a single direction or omnidirectional), or receive one or more signals from any direction, and at any frequency range or in accordance with any protocol, standard or specification.

Additionally, the coordinator 220 may further include any type of power source for providing electrical power or other forms of power in support of one or more electrical loads. Such power sources may include, for example, one or more batteries or other power cells, e.g., dry cell or wet cell batteries such as lead-acid batteries, lithium-ion batteries, nickel cadmium batteries or nickel metal hydride batteries, or any other type, size or form of batteries, and may each have any cell voltages, peak load currents, charge times, specific energies, internal resistances or cycle lives, or other power ratings. The coordinator 220 may also include any type, size or form of other power source, e.g., other than a battery, including but not limited to one or more fuel cells or solar cells.

The devices 210-1, 210-2 . . . **210-*n* may be any type or form of sensor (e.g., a camera, a load sensor, or another sensor), computing device (e.g., a smartphone, a tablet computer, a laptop computer, a desktop computer, or computing devices provided in wristwatches, televisions, set-top boxes, automobiles or any other appliances or machines), or any other machine. The processors of the devices 210-1, 210-2 . . . 210-*n*** may be configured to execute one or more sets of instructions, which may be stored in the one or more data stores of such devices or elsewhere, for causing such devices to perform any of the functions or operations described herein. For example, in some implementations, the processors may generate one or more frames of data corresponding to an authentication request or an association request, and cause such frames of data to be transmitted to one or more other devices, as necessary. In some other implementations, however, the processors may interpret one or more frames of data, which may correspond to an authentication response, or an association response, as necessary.

The processors of the devices 210-1, 210-2 . . . **210-*n* may be configured to perform any type or form of computing function, including but not limited to the execution of one or more machine learning algorithms or techniques, for controlling any aspects of the operation of the devices 210-1, 210-2 . . . 210-*n* and any computer-based components thereon, e.g., data stores, transceivers, input/output (or "I/O") devices or others. The processors may further control any aspects of the operation of any number of additional components that may be provided on the devices 210-1, 210-2 . . . 210-*n*, e.g., one or more other sensors, illuminators (e.g., lights), or the like. In some embodiments, the processors may be configured to initiate a handshake with the coordinator 220 or any other gateways (not shown) e.g., by exchanging one or more packets of information or data with the coordinator 220. A successfully completed handshake may open up a communications channel between the coordinator 220 and any of the devices 210-1, 210-2 . . . 210-*n***, e.g., in accordance with a communication schedule.

In some embodiments, the processors of the devices 210-1, 210-2 . . . **210-*n*** may be configured to determine that a handshake has been accepted or refused by one or more gateways, and to execute one or more actions in response to the acceptance or refusal, e.g., to transfer data according to one or more protocols or standards, such as Transmission Control Protocol (or "TCP"), Transport Layer Security (or "TLS"), Secure Sockets Layer ("or "SSL"), or others.

The processors of the devices 210-1, 210-2 . . . **210-*n*** may include a uniprocessor system including one processor, or a multiprocessor system including several processors (e.g., two, four, eight, or another suitable number), and may be capable of executing instructions. For example, in some embodiments, such processors may be a general-purpose or embedded processor implementing any of a number of instruction set architectures (or "ISA"), such as the x86, PowerPC, SPARC, or MIPS ISAs, or any other suitable ISA. Where the processors are components of a multiprocessor system, each of the processors within the multiprocessor system may operate the same ISA, or different ISAs.

The data stores of the devices 210-1, 210-2 . . . **210-*n* may be further configured to store any other data items accessible by or to processors thereof. The data stores may be implemented using any suitable technology, such as static random-access memory (or "SRAM"), synchronous dynamic RAM (or "SDRAM"), nonvolatile/Flash-type memory, or any other type of memory. Information or data stored in the data stores may be generated by one or more of the devices 210-1, 210-2 . . . 210-*n*, or the coordinator 220**, or any systems in communication therewith, and transmitted by transmission media or signals, such as electrical, electromagnetic, or digital signals, which may be conveyed via a communication medium such as a wired and/or a wireless link.

The transceivers of the devices 210-1, 210-2 . . . **210-*n* may be configured to transmit and/or receive Wi-Fi signals, Bluetooth® signals, NFC signals, or any other type or form of signals within any frequency spectra or having any intensity or center frequency. The transceivers may include any number of processors, chips (e.g., chipsets) or other components that are commonly associated with or required for communication according to a selected communications protocol or standard, or programmed as necessary (e.g., with one or more applications and/or sets of instructions) in order to communicate according to the selected protocol or standard. The signals transmitted and/or received by the transceivers may be of any kind or type, and may be sent over the one or more networks 290 or directly to one or more of the coordinators 220** or any other computer devices or components.

The devices 210-1, 210-2 . . . **210-*n* may include one or more I/O devices, which may be configured to receive and provide information to human users of the devices 210-1, 210-2 . . . 210-*n* and may include, but need not be limited to, a display, (e.g., a touch-screen display), a scanner, a keyboard, a keypad, a biometric scanner, an audio transducer, one or more speakers, one or more imaging devices such as a video camera, and any other types of input or output devices that may support interaction between the devices 210-1, 210-2 . . . 210-*n* and a human operator. The devices 210-1, 210-2 . . . 210-*n*** may further include one or more displays or other types or forms of systems for electronically displaying information, including but not limited to an electronic ink display, a liquid crystal display (or "LCD"), a light-emitting diode (or "LED") display, or an organic light-emitting diode (or "OLED") display.

Moreover, in some implementations, the processors of the devices 210-1, 210-2 . . . **210-*n* may also generate beacons, e.g., enhanced beacons, or other information regarding the operation of the area network 205 or any other area networks (not shown), and the transceivers of the devices 210-1, 210-2 . . . 210-*n* may transmit such beacons or other information to the coordinator 220**, or one or more other nodes or other devices.

The data processing system 280 includes one or more physical computer servers 282 having one or more computer processors and any number of data stores 284 (e.g., databases) or transceivers 286 associated therewith, as well as provided for any specific or general purpose. For example, the data processing system 280 of FIG. 2 may be independently provided for the exclusive purpose of receiving, analyzing or storing information or data received from any source or, alternatively, provided in connection with one or more physical or virtual services configured to receive, analyze or store such imaging data or other information or data, as well as one or more other functions. The servers 282 may be connected to or otherwise communicate with the data stores 284, which may store any type of information or data, including but not limited to acoustic signals, imaging data, or other information or data, for any purpose. The servers 282 may also connect to or otherwise communicate with the network 290 through the sending and receiving of digital data. For example, the data processing system 280 may include any facilities, stations or locations having the ability or capacity to receive and store information or data, such as media files, from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles.

The transceivers 286 may be configured to enable the data processing system 280 to receive or transmit information or data to or from any of the coordinators 220, or any other computing device, over the network 290. For example, the transceivers 286 may be configured to communicate through one or more wired or wireless means, e.g., wired technologies such as USB or fiber optic cable, or standard wireless protocols, standards or specifications such as Bluetooth® or any Wi-Fi protocol, such as over the network 290 or directly. The transceivers 286 may also be configured to enable the data processing system 280 to communicate with any of the devices 210-1, 210-2 . . . 210-*n* according to any wireless protocols, standards or specifications such as Bluetooth® or Wi-Fi protocol, by way of the coordinator 220.

For example, the transceivers 286 may be configured to communicate according to the IEEE 802.15.4 family of protocols, standards or specifications for wireless communications over one or more networks (e.g., personal area networks). The transceivers 286 may perform any necessary protocol, timing or other data transformations in order to convert data signals from a first format suitable for use by one component into a second format suitable for use by another component. For example, in some implementations, the transceivers 286 may include support for devices attached through various types of peripheral buses, e.g., variants of the PCI bus standard or the USB standard. In some other implementations, functions of the transceivers 286 may be split into two or more separate components, or incorporated directly into the server 282. Additionally, the transceivers 286 may be configured to operate or perform any type of encryption and on any basis.

The network 290 may be any wired network, wireless network, or combination thereof, and may comprise the Internet in whole or in part. In addition, the network 290 may be or include one or more of a personal area network, local area network, wide area network, cable network, satellite network, cellular telephone network, or combinations or portions thereof. The network 290 may also be a publicly accessible network of one or more linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (or "GSM") network, a Code Division Multiple Access (or "CDMA") network, a Long-Term Evolution (or "LTE") network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "materials handling facility," or like terms, may be automated steps performed by computer devices or resources, or implemented within software modules (or computer programs) executed by one or more general purpose computers. Those of ordinary skill in the pertinent arts would also recognize that process steps described as being performed by a "materials handling facility," or like terms, may be typically performed by a human, but could, alternatively, be performed by an automated agent. The protocols and components for providing communication between a materials handling facility and the coordinator 220 or any of the devices 210-1, 210-2 . . . 210-*n* are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors, the servers, the data stores, or the transceivers or the I/O devices of the devices 210-1, 210-2 . . . 210-*n* as well as the servers 282, the data stores 284 or the transceivers 286 of the data processing system 280, or any other computers or control systems having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the system 200 of FIG. 2 is shown as having a single area network 205, having a single coordinator 220 and three devices 210-1, 210-2 . . . 210-*n*, those of ordinary skill in the pertinent arts will recognize that the systems and methods of the present disclosure are not so limited. Rather in some embodiments, a system may include, or a method may involve, any number of PANs, each having any number of nodes or devices associated therewith. For example, in some implementations, a materials handling facility may include hundreds or even thousands of devices, and any number of coordinators or gateways in communication with such devices. Furthermore, the words "node" and "device" may be used interchangeably herein to refer to a component of a communications network, e.g., a redistribution point, or an endpoint, or any other component that is capable of generating, transmitting or receiving information or data over one or more channels and for one or more durations.

In some implementations, an area network may be made up of multiple coordinators or gateways, with each coordinator or gateway in turn providing connectivity to a set of devices (e.g., leaf nodes such as sensors or other devices). Each of the coordinators or gateways and their respective devices may be synchronized in time, and may adopt TSCH to enable access to channels. Each of the coordinators or gateways may also be synchronized to a single coordinator, which may be called a "root coordinator," and may serve as a timing master for every other device (e.g., other coordinators and sensors).

Figure 3:
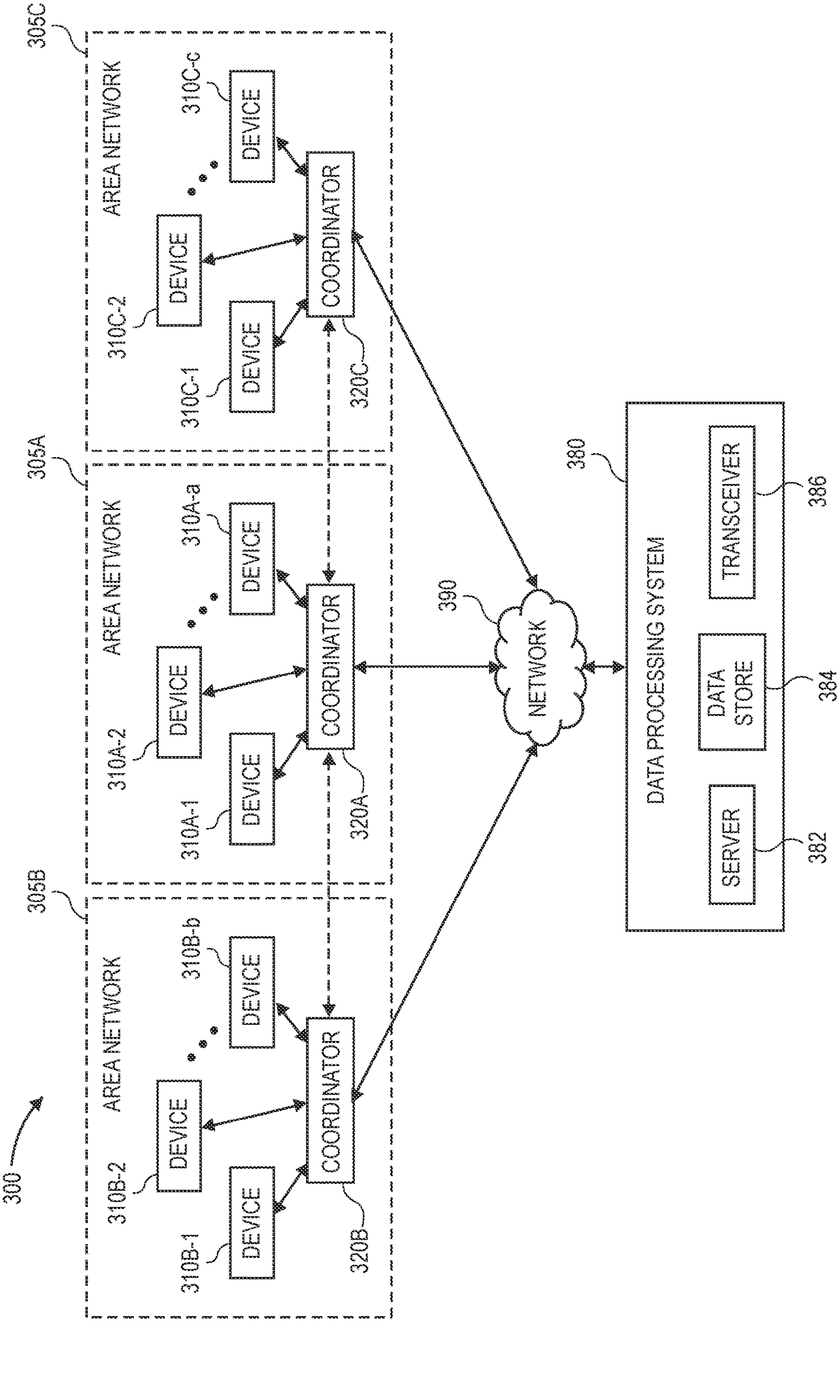
FIG. 3 is a block diagram of one system for detecting or merging synchronized wireless networks in accordance with implementations of the present disclosure.

Referring to FIG. 3, block diagrams of one system 300 for detecting or merging synchronized wireless networks in accordance with implementations of the present disclosure are shown. The system 300 includes a first area network (e.g., a personal area network, or PAN) 305A, a second area network 305B, a third area network 305C and an external network 390. Except where otherwise noted, reference numerals preceded by the number "3" in FIG. 3 refer to elements that are similar to elements having reference numerals preceded by the number "2" in FIG. 2 or by the number "1" shown in FIGS. 1A through 1I.

As is shown in FIG. 3, the area network 305A includes a first plurality of devices 310A-1, 310A-2 . . . 310A-a connected to a first coordinator (or gateway) 320A, while the area network 305B includes a second plurality of devices 310B-1, 310B-2 . . . 310B-b connected to a second coordinator (or gateway) 320B, and the area network 305C includes a third plurality of devices 310C-1, 310C-2 . . . 310C-c connected to a third coordinator (or gateway) 320C.

The first coordinator 320A is configured to associate with any or all of the devices 310A-1, 310A-2 . . . 310A-a, and to enable such devices 310A-1, 310A-2 . . . 310A-a to communicate with one or more external computer devices or systems, e.g., the data processing system 380 or others (not shown), over the external network 390, which may include the Internet in whole or in part. Similarly, the second coordinator 320B is configured to associate with any or all of the devices 310B-1, 310B-2 . . . 310B-b, and to enable such devices 310B-1, 310B-2 . . . 310B-b to communicate with one or more external computer devices or systems, e.g., the data processing system 380 or others (not shown), over the external network 390. Likewise, the third coordinator 320C is configured to associate with any or all of the devices 310C-1, 310C-2 . . . 310C-c, and to enable such devices 310C-1, 310C-2 . . . 310C-c to communicate with one or more external computer devices or systems, e.g., the data processing system 380 or others (not shown), over the external network 390.

Moreover, the coordinator 320A is configured to synchronize the area network 305A with the area network 305B and the area network 305C, e.g., by exchanging control signals, communication schedules, or any other information, data or metadata with the area network 305B and the area network 305C.

The coordinators 320A, 320B, 320C shown in FIG. 3 may include or share any of the same attributes, features or traits of the coordinator 220 described above with respect to FIG. 2. Similarly, each of the devices 310A-1, 310A-2 . . . 310A-a, the devices 310B-1, 310B-2 . . . 310B-b, and the devices 310C-1, 310C-2 . . . 310C-c shown in FIG. 3 may include or share any of the same attributes, features or traits of the devices 210-1, 210-2 . . . 210-*n* described above with respect to FIG. 2. Although FIG. 3 shows only three area networks 305A, 305B, 305C, as well as three coordinators 320A, 320B, 320C, any number of area networks may be connected to the network 390, and each of the area networks 305A, 305B, 305C may have any number of devices connected thereto.

Figure 4A:
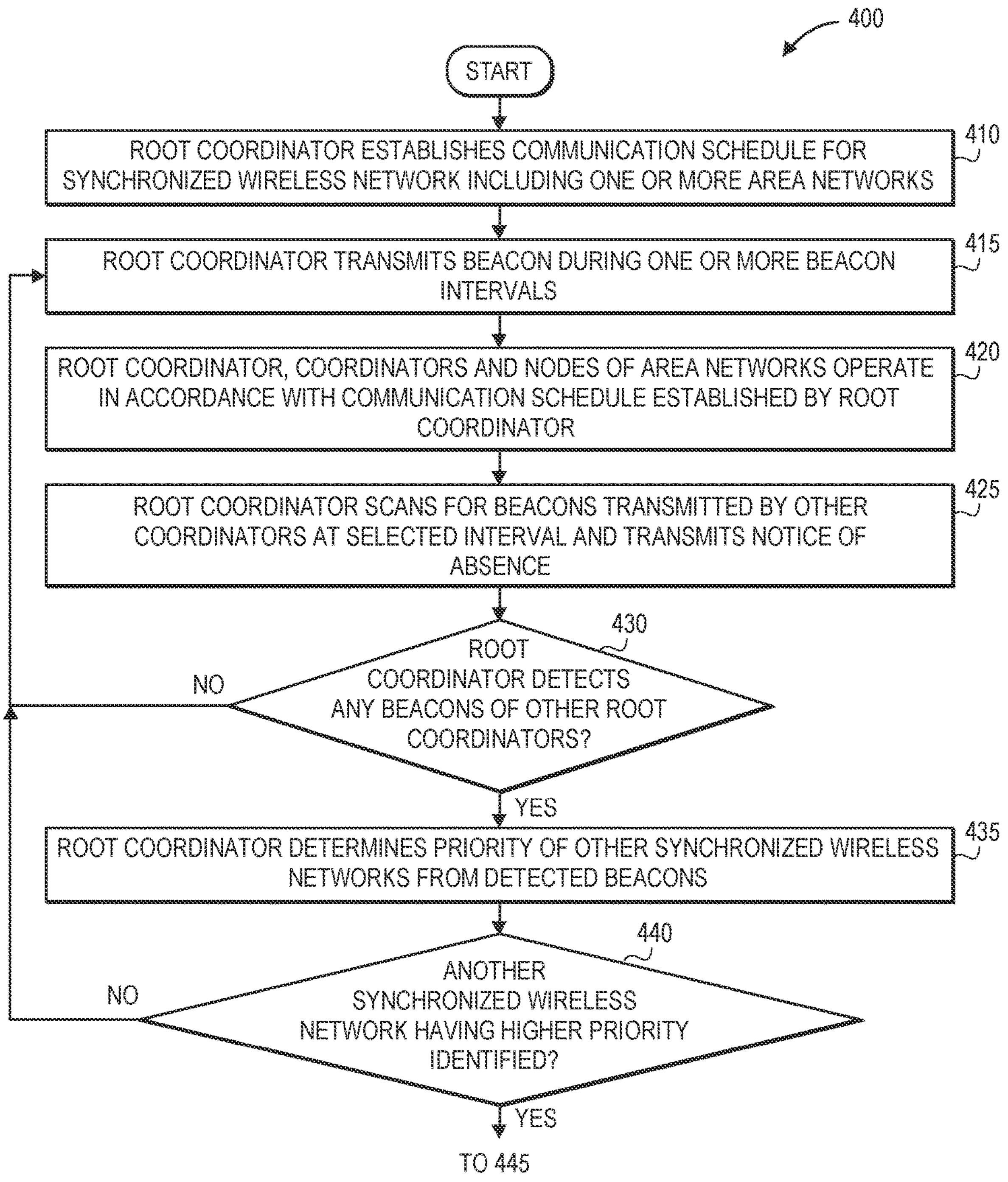
FIGS. 4A and 4B are a flow chart of one process for detecting or merging synchronized wireless networks in accordance with implementations of the present disclosure.
Figure 4B:
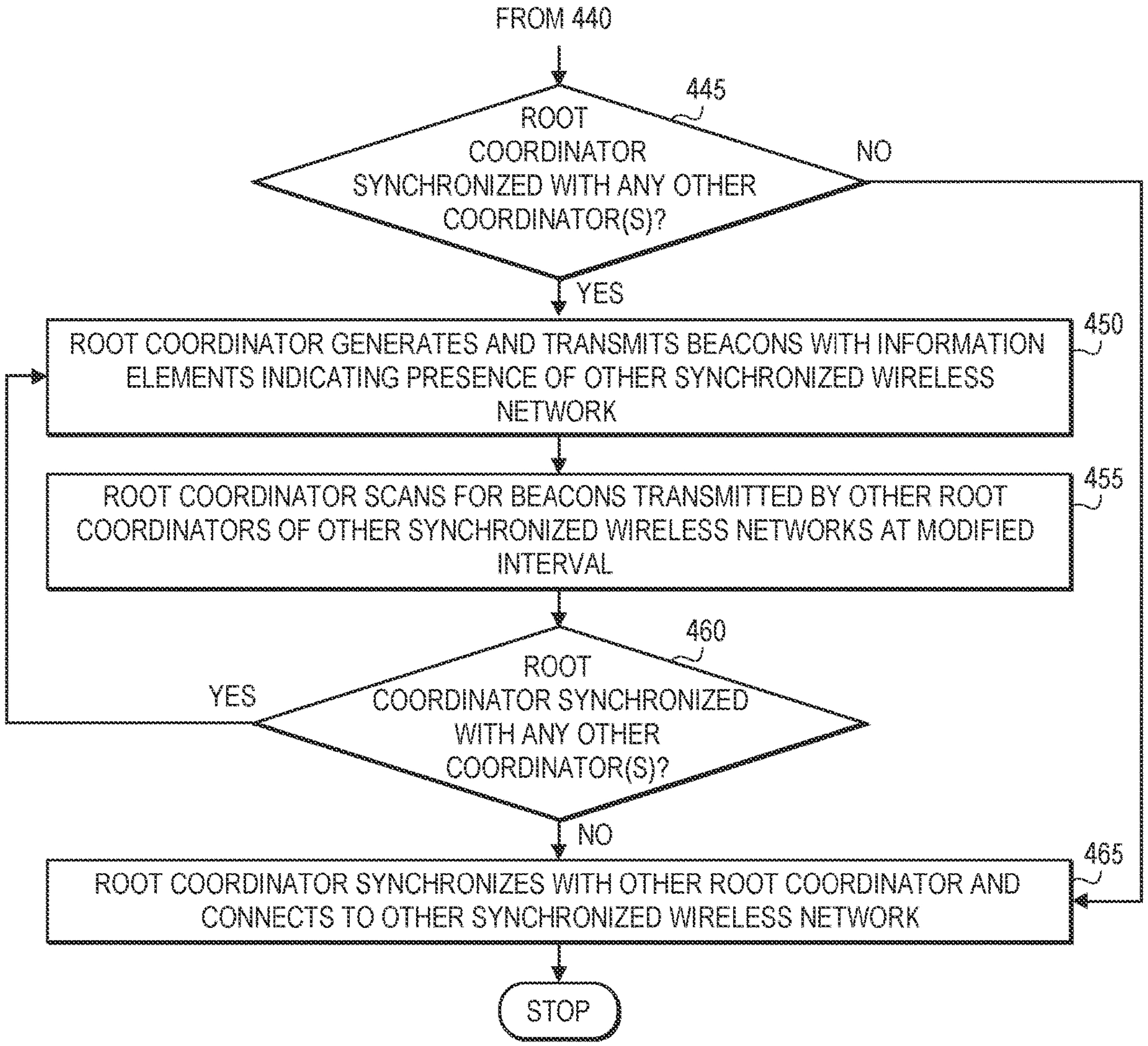

Referring to FIGS. 4A and 4B, a flow chart 400 of one process for detecting or merging synchronized wireless networks in accordance with implementations of the present disclosure is shown. At box 410, a root coordinator establishes a communication schedule for a synchronized wireless network including one or more area networks. For example, in some implementations, the synchronized wireless network may include one or more area networks, e.g., PANs, and may be formed by synchronizing one node, such as a root coordinator, with one or more other nodes, such as coordinators of one or more area networks. The communication schedule may include cells that are shared for communication by any devices of the synchronized wireless network, e.g., in a common (e.g., shared) channel and timeslot, as well as cells that are dedicated for communication between any two devices of the synchronized wireless network, e.g., in a dedicated channel and timeslot, and cells that are unscheduled, or otherwise neither shared nor dedicated. The channels or the timeslots of the communication schedule may be selected in any manner, e.g., randomly or pseudo-randomly, in a hopping sequence.

At box 415, the root coordinator transmits a beacon including information regarding a communication schedule during one or more beacon intervals.

A beacon transmitted by the root coordinator may include any number of information elements identifying aspects of enhanced beacon intervals or superframes, or schedules thereof. In some implementations, a beacon may include an information element identifying a multicast access period of an enhanced beacon interval, e.g., a vendor-specific (or entity-specific) nested information element that denotes a number of time slots following the beacon during which a coordinator may transmit broadcast or multicast frames. A beacon may further include an information element identifying a contention access period of an enhanced beacon interval, e.g., a vendor-specific (or entity-specific) nested information element denoting a number of time slots for sensors to transmit frames of data to the coordinator. A beacon may also include an information element identifying a coordinator load, e.g., a vendor-specific (or entity-specific) information element to denote current traffic and loading on the coordinator, such as a number of nodes that have joined the coordinator. A beacon may further include an information element identifying an epoch time, e.g., a vendor-specific (or entity-specific) information element denoting a network time protocol epoch. A beacon may also include an information element identifying an operating mode of the beacon, which may denote an interval of time, e.g., a number of time slots, identifying a size of a superframe of multiple beacon intervals, as well as an interval of time during which beacons are transmitted by the coordinator. For example, in some implementations, a beacon may identify a default number of time slots representing the size of the superframe, or three hundred thirty-five, and a default interval of time by which beacons are transmitted by the coordinator, or sixty-seven. Alternatively, the beacon may identify a size of the superframe or the default interval of time by any other number of time slots.

During operation of the synchronized wireless network, the root coordinator transmits beacons including information regarding the communication schedule during one or more beacon intervals. The beacons may also include information regarding synchronization, channel hopping, or channels and timeslots that are utilized by the root coordinator or available for communication by other area networks or nodes or other devices connected thereto. Other coordinators scanning one or more channels may capture a beacon transmitted by the root coordinator and synchronize with the root coordinator, while also completing one or more authentication, authorization or security protocols. Alternatively, in some other implementations, a node that transmits the beacon may be any other type or form of device or system and need not be the root coordinator.

At box 420, the root coordinator, the coordinators and the nodes of the area networks operate in accordance with communication schedules established by the root coordinator or the respective coordinators. After receiving one or more beacons from the root coordinator, and synchronizing with the root coordinator accordingly, coordinators of the area networks transmit beacons to nodes of their respective area networks in accordance with communication schedules established by such coordinators, or by the root coordinator for the synchronized wireless network as a whole. The beacons transmitted by the coordinators may share one or more of properties of the beacon transmitted by the root coordinator, and may establish communication schedules for the respective area networks of the synchronized wireless network, such that transmissions by or between nodes of such networks do not conflict with one another.

Nodes of an area network may be any type of devices or systems, including but not limited to cameras, load sensors or electronic shelf labels as well as cash registers, climate control devices (e.g., controllers such as thermostats or components such as heaters, air conditioners, humidifiers, fans or others), remote power switches, gate sensors, turnstiles, pedestals, security cameras, radiofrequency identification (or "RFID") transmitters or receivers, motion sensors, computer devices or systems (e.g., desktop computers, laptop computers, mobile devices, smartphones, tablets or smart speakers), proximity sensors, lighting components, or any other devices or systems that may be configured to communicate over one or more networks according to any protocol or standard.

Where a coordinator of an area network establishes a schedule for communication within the area network, information regarding the schedule may be included in the beacon transmitted thereby. For example, the communication schedule may be a channel hopping schedule, e.g., a time-slotted (or time-synchronized) channel hopping schedule, or a TSCH schedule, according to the IEEE 802.15.4 protocol, or any other protocol, standard or specification. In some implementations, a schedule may include a plurality of channels and a plurality of timeslots, and may be represented as a two-dimensional matrix with cells in rows corresponding to channels (or channel offsets), and columns corresponding to timeslots. Each cell of a schedule may represent a potential link between two nodes of the area network. For example, some of the cells may be dedicated for transmissions by a single node of an area network, e.g., a dedicated cell, and some of the cells may be open and available for transmissions by any number of nodes of the area network, e.g., a shared cell.

Once a communication schedule has been established for the synchronized wireless network, the coordinators of the area networks communicate according to the communication schedule. Once a communication schedule has been established by one of the coordinators for an area network, nodes of the area network communicate according to the communication schedule. For example, an initiating node may transmit data frames to or receive data frames from a responding node, and the responding node may receive data frames from or transmit data frames to the initiating node, during one or more of such timeslots.

In some implementations, the communication schedule may include any number of activities within any of the cells, e.g., transmitting, receiving, or "sleeping," and each of the cells may offer an allocation of bandwidth for such activities. Where a cell calls for a node to transmit data to another node, the transmitting node may verify an outgoing buffer to determine whether a packet is available for transmission, and transmit the packet to the other node. Where a cell calls for a node to receive data from another node, the cell monitors a given channel to receive a given packet, and acknowledges any packets with a reply message.

At box 425, the root coordinator scans for beacons transmitted by any other coordinators of any other synchronized wireless networks at a selected interval, and transmits a notice of its absence. The selected interval may be any number of minutes or seconds, such as ten minutes, twenty minutes, thirty minutes, or more. For example, the root coordinator may randomly select a channel, and continue to monitor that channel for at least a predetermined period of time. In some implementations, the root coordinator may conclude a scan for beacons upon a timeout, which may occur if a beacon is not detected from another root coordinator after approximately sixty-four seconds. Alternatively, the root coordinator may scan for any other period of time.

When the root coordinator is actively scanning for beacons transmitted by other root coordinators, the root coordinator may also inform any other coordinators with which the root coordinator is synchronized that the root coordinator is unavailable for communication, other than the transmission of beacons. For example, where beacons transmitted by the root coordinator include one or more information elements, e.g., a synchronization control information element, such information elements may include one or more bits, e.g., an "absent" bit, indicating that the root coordinator is not available for communication except to transmit beacons until at least the transmission of another beacon.

Additionally, in some implementations, upon detecting a beacon from another root coordinator, the root coordinator may continue to scan each of a plurality of other channels for a predetermined period of time, e.g., approximately one second to approximately sixty-four seconds, to determine whether any other beacons were transmitted at other channel offsets. For example, the predetermined period of time may range between a duration of one timeslot and a duration defined by a product of a number of the plurality of channels, a number of the plurality of timeslots and the duration of one timeslot.

At box 430, whether the root coordinator has detected any other beacons transmitted by any other root coordinators of other synchronized wireless networks is determined.

If the root coordinator does not detect any beacons transmitted by any other root coordinators, then the process returns to box 415, where the root coordinator transmits another beacon including information regarding a communication schedule to the coordinators of the synchronized wireless network during one or more beacon intervals, and to box 420, where the root coordinator, the coordinators and the nodes of the area networks continue to operate in accordance with the communication schedule established by the root coordinator.

If the root coordinator detects any beacons transmitted by any other root coordinators of any other synchronized wireless networks, however, then the process advances to box 435, where the root coordinator determines a level of priority of each of such other synchronized wireless networks based on such beacons.

At box 440, whether another synchronized wireless network having a higher level of priority than the synchronized wireless network of the root coordinator has been detected from the beacons is determined. In some implementations, a level of priority of a synchronized wireless network may be determined based on an absolute slot number, or a total number of timeslots elapsed since the synchronized wireless network was initially deployed, which may be indicated by a value in a beacon transmitted by the root coordinator. The absolute slot number thus indicates an age of the synchronized wireless network. Alternatively, a level of priority of the synchronized wireless network, may be determined on any basis other than an absolute slot number, or in any manner other than by a value in a beacon transmitted by the root coordinator. For example, a level of priority of another synchronized wireless network may be determined based on a number of coordinators synchronized with a root coordinator of the synchronized wireless network, or numbers of other nodes (e.g., leaf nodes, such as sensors or other devices) connected to such coordinators.

If no other synchronized wireless network having a higher level of priority is detected, then the process returns to box 415, where the root coordinator transmits another beacon including information regarding a communication schedule to the coordinators of the synchronized wireless network during one or more beacon intervals, and to box 420, where the root coordinator, the coordinators and the nodes of the area networks continue to operate in accordance with the communication schedule established by the root coordinator. In such instances, such as where the synchronized wireless network has the highest level of priority of all detected synchronized wireless networks, any other root coordinators that may have detected the presence of the root coordinator may then begin to merge with the synchronized wireless network, in accordance with one or more of the process steps shown below in boxes 445 through 465.

If another root coordinator having a higher level of priority than the synchronized wireless network is detected, however, then the process advances to box 445, where whether the root coordinator is synchronized with any other coordinators is determined.

If the root coordinator is not synchronized with any other coordinators, then the process advances to box 465, where the root coordinator synchronizes with the other root coordinator and connects to the other synchronized wireless network, and the process ends. For example, if the root coordinator does not have any synchronized coordinators, then the root coordinator may immediately synchronize with the other root coordinator without disruption or delay.

If the root coordinator is synchronized with any other coordinators, however, then the process advances to box 450, where the root coordinator generates and transmits a beacon having one or more information elements identifying the presence of the other synchronized wireless network and including a notice of absence. For example, the beacon may include information elements with one or more bits or values, e.g., a "multi-trees" bit, indicating that one or more other higher-priority synchronized wireless networks have been detected. Alternatively, the beacon may include any other information elements or other features for informing nodes receiving the beacon that other root coordinators or synchronized wireless networks are present. Moreover, in some implementations, the "multi-trees" bit may indicate a number of the other root coordinators or synchronized wireless networks that are present.

At box 455, the root coordinator scans for beacons transmitted by any other root coordinators of any other synchronized wireless networks at a modified interval. For example, where the root coordinator was configured to capture beacons at a selected interval at box 425, the root coordinator may modify the interval upon detecting another beacon transmitted by another root coordinator, and determining that another synchronized wireless network is available for synchronization and connection. The modified interval may be longer than the selected interval, in order to enable any other coordinators synchronized with the root coordinator to capture the beacon transmitted by the other root coordinator, and to synchronize with and connect to the other root coordinator.

At box 460, whether the root coordinator is synchronized with any other coordinators may be determined. For example, upon receiving the beacon transmitted at box 455, any of the coordinators that are synchronized with the root coordinator may have elected to synchronize with the other root coordinator whose presence is indicated in the beacon. If the root coordinator does not have any other coordinators synchronized therewith, then the process advances to box 465, where the root coordinator synchronizes with the other root coordinator and connects to the other synchronized wireless network, and the process ends. If the root coordinator has any other coordinators synchronized therewith, however, then the process returns to box 450, where the root coordinator generates and transmits another beacon having one or more information elements identifying the presence of the other root coordinator (or the other synchronized wireless network) and including a notice of absence, and to box 455, where the root coordinator scans for beacons transmitted by any other root coordinators of any other synchronized wireless networks at a further modified interval, as necessary.

Figure 5A:
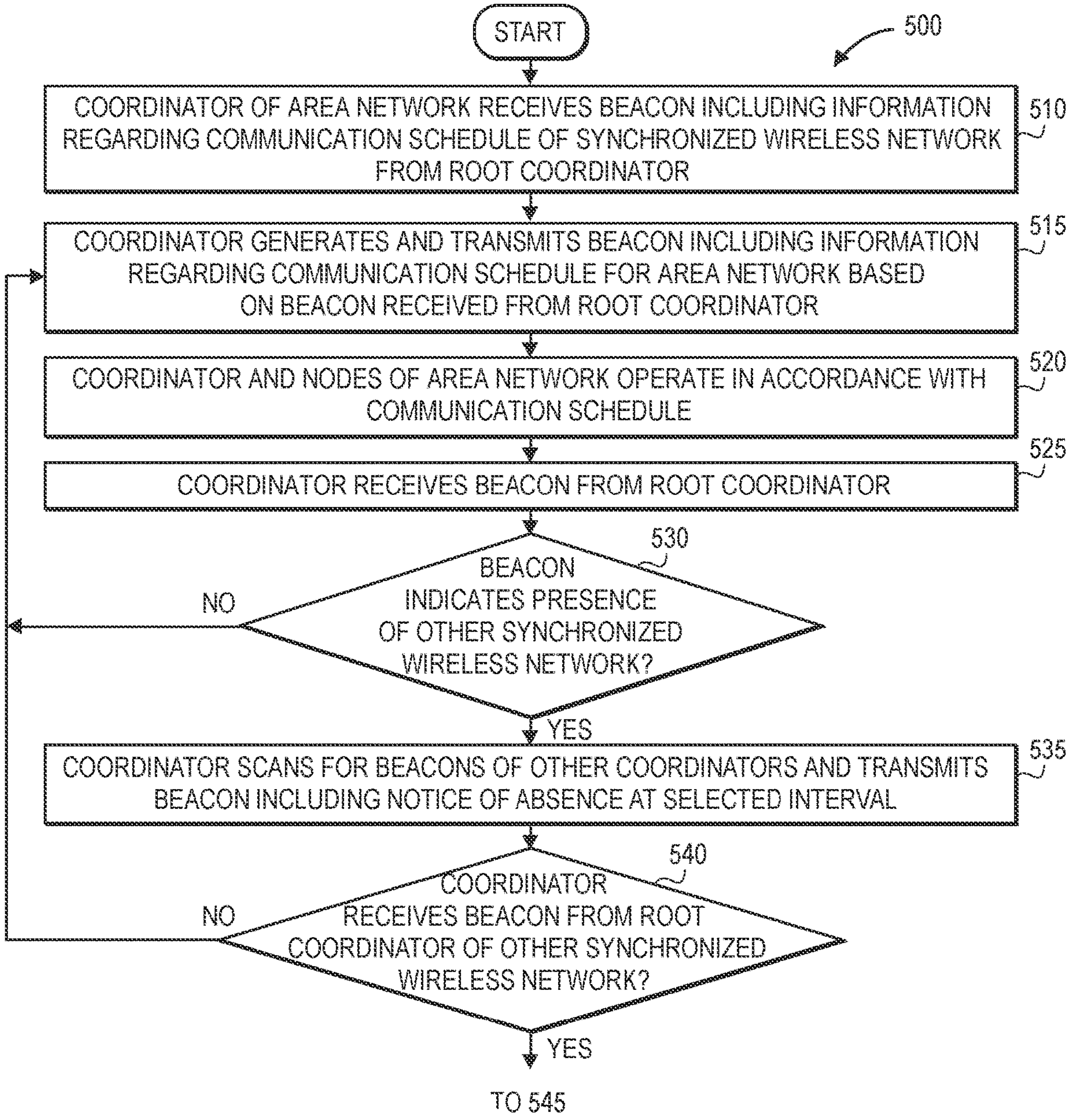
FIGS. 5A and 5B are a flow chart of one process for detecting or merging synchronized wireless networks in accordance with implementations of the present disclosure.
Figure 5B:
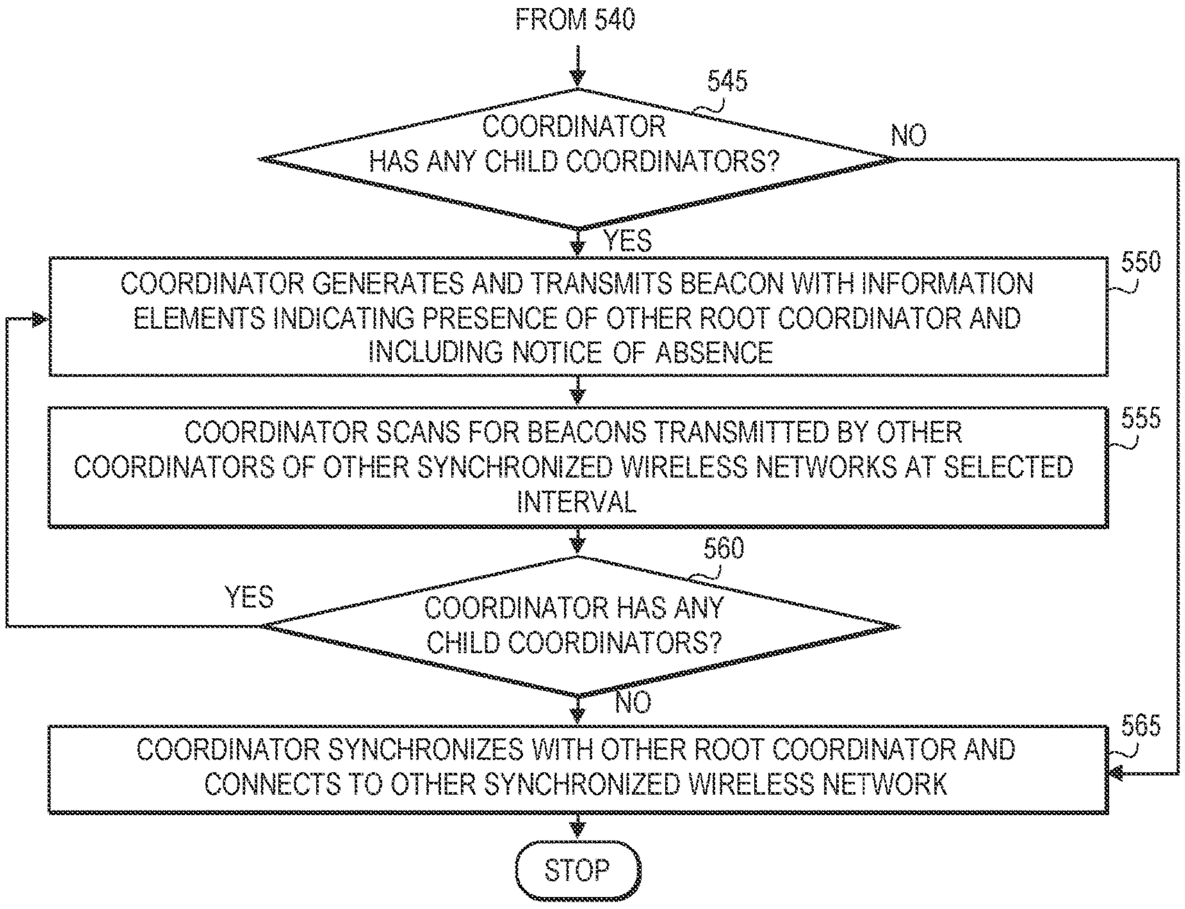

Referring to FIGS. 5A and 5B, a flow chart 500 of one process for detecting or merging synchronized wireless networks in accordance with implementations of the present disclosure is shown. At box 510, a coordinator of an area network receives a beacon including information regarding a communication schedule for a synchronized wireless network from a root coordinator. The beacon may include information regarding synchronization, channel hopping, or channels and timeslots that are to be utilized by the root coordinator or available for communication by the coordinator of the area network, or nodes or other devices connected thereto. For example, the beacon transmitted by the root coordinator may include any number of information elements identifying aspects of enhanced beacon intervals or superframes, or schedules thereof.

At box 515, the coordinator generates and transmits a beacon including a communication schedule for the area network based on the beacon received from the root coordinator at box 510. The beacon may share one or more of properties of the beacon received from the root coordinator, and may establish communication schedules for the respective area networks of the synchronized wireless network, such that transmissions by or between nodes of such networks do not conflict with one another.

Nodes of the area network may be any type of devices or systems, including but not limited to cameras, load sensors or electronic shelf labels as well as cash registers, climate control devices, remote power switches, gate sensors, turnstiles, pedestals, security cameras, RFID transmitters or receivers, motion sensors, computer devices or systems, proximity sensors, lighting components, or any other devices or systems that may be configured to communicate over one or more networks according to any protocol or standard.

Where a coordinator of an area network establishes a schedule for communication within the area network, information regarding the schedule may be included in the beacon transmitted thereby. For example, the communication schedule may be a channel hopping schedule, e.g., a TSCH schedule, and may include a plurality of channels and a plurality of timeslots, and may be represented as a two-dimensional matrix with cells in rows corresponding to channels (or channel offsets), and columns corresponding to timeslots. Each cell of a schedule may represent a potential link between two nodes of the area network. For example, some of the cells may be dedicated for transmissions by a single node of an area network, e.g., a dedicated cell, and some of the cells may be open and available for transmissions by any number of nodes of the area network, e.g., a shared cell.

In some implementations, a synchronized wireless network may include a single area network, such as a PAN, having a single coordinator that receives a beacon at box 510 and generates and transmits a beacon at box 515. Alternatively, the synchronized wireless network may include any number of PANs or other area networks, each having a coordinator that receives a beacon at box 510 and generates and transmits a beacon at box 515.

At box 520, the coordinator and nodes of the area network operate in accordance with the communication schedule defined in the beacon transmitted at box 515. Nodes of the area network may communicate according to the communication schedule, e.g., by transmitting frames to or receiving data frames from a responding node, and the responding node may receive data frames from or transmit data frames to such nodes, during one or more timeslots of the communication schedule.

In some implementations, the communication schedule may include any number of activities within any of the cells, e.g., transmitting, receiving, or "sleeping," and each of the cells may offer an allocation of bandwidth for such activities. Where a cell calls for a node to transmit data to another node, the transmitting node may verify an outgoing buffer to determine whether a packet is available for transmission, and transmit the packet to the other node. Where a cell calls for a node to receive data from another node, the cell monitors a given channel to receive a given packet, and acknowledges any packets with a reply message.

At box 525, the coordinator receives another beacon from the root coordinator of the synchronized wireless network. The beacon may be received within a channel and during a timeslot dedicated for transmission of beacons by the root coordinator, or at any other time.

At box 530, whether the beacon indicates the presence of any other synchronized wireless networks is determined. For example, the beacon may be transmitted during ordinary operations of the synchronized wireless network, and may include information elements representing a communication schedule of the synchronized wireless network, which may remain unchanged as compared to the beacon received at box 510, or may be revised or updated within the beacon received at box 525. Alternatively, or additionally, the beacon may include one or more information elements indicating that the root coordinator has detected another root coordinator of a synchronized wireless network having a higher level of priority than its own. For example, the beacon may indicate that another nearby synchronized wireless network has a higher level of priority, such as a synchronized wireless network having a greater absolute slot number than its own, by an information element with one or more bits or values, e.g., a "multi-trees" bit.

If the beacon does not indicate that any other synchronized wireless networks are present, then the process returns to box 515, where the coordinator generates and transmits another beacon including information regarding a communication schedule for the area network based on the beacon received at box 525. The beacon generated and transmitted by the coordinator at box 515 may be the same beacon previously generated and transmitted by the coordinator, or a different beacon, and may include the same number or type of information elements, or other numbers or types of information elements.

If the beacon indicates that any other synchronized wireless networks are present, then the process advances to box 535, where the coordinator scans for beacons of other coordinators and transmits a beacon including a notice of absence at a selected interval.

At box 540, whether the coordinator has received a beacon from the root coordinator of the other synchronized wireless network is determined. If the coordinator has not received the beacon from the root coordinator of the other synchronized wireless network, then the coordinator is unable to synchronize with that network, or report the presence of that network to its coordinators or nodes. Therefore, the process returns to box 515, where the coordinator generates and transmits another beacon including a communication schedule for the area network. If the coordinator receives the beacon from the root coordinator of the other synchronized wireless network, then the process advances to box 545, where whether the coordinator has any child coordinators is determined.

If the coordinator does not have any child coordinators, then the process advances to box 565, where the coordinator synchronizes with the other root coordinator identified in the beacon received from the root coordinator at box 525, and connects to the other synchronized wireless network of that root coordinator, and the process ends. To synchronize with the other root coordinator, the coordinator may initiate and complete any handshakes with that root coordinator, e.g., by exchanging one or more packets of information or data, or complete any number of authentication, authorization or security protocols, as necessary, prior to joining the other synchronized wireless network.

In some implementations, the coordinator may determine that multiple other root coordinators are transmitting beacons, or that multiple other synchronized wireless networks may be available. In such instances, the coordinator may identify one of the other synchronized wireless networks having a highest level of priority, e.g., a highest absolute slot number, and may elect to synchronize with a root coordinator of that synchronized wireless network and connect with that synchronized wireless network accordingly.

If the coordinator has any child coordinators, however, then the process advances to box 550, where the coordinator generates and transmits a beacon including information elements indicating the presence of the other root coordinator and including a notice of absence. For example, the beacon transmitted by the coordinator to its child coordinators may include information elements having one or more bits indicating the presence of other synchronized wireless networks, e.g., "multi-trees" bits, and also one or more bits indicating that the coordinator is unavailable for communication other than the transmission of beacons, e.g., "absent" bits. Alternatively, the coordinator may inform its child coordinators of the presence of the other root coordinator or provide notice of its unavailability for communication in any other manner.

At box 555, the coordinator scans for beacons transmitted by any other root coordinators of other synchronized networks at a selected interval, which may be any number of minutes or seconds, such as ten minutes, twenty minutes, thirty minutes, or more.

The selected interval may be the same interval by which the root coordinator scans for beacons transmitted by any other root coordinators, or any other interval. For example, the interval may be selected based on numbers of child coordinators or nodes with which the coordinator is synchronized or to which the coordinator is connected, as well as types of such coordinators or nodes, service requirements of such coordinators or nodes, or on any other basis. A duration of the interval may be selected, for example, to enable any child coordinators of the coordinator, or child coordinators of such child coordinators, to synchronize with the other root coordinator and connect to the other synchronized wireless network, or on any other basis.

At box 560, whether the coordinator has any child coordinators is determined. For example, the coordinator may determine whether any of its child coordinators remain synchronized therewith, or whether each of such child coordinators has already departed the synchronized wireless network, e.g., by synchronizing with the other root coordinator and connected to the other synchronized wireless network. If the coordinator no longer has any child coordinators, then the process advances to box 565, where the coordinator connects to the other synchronized wireless network of that root coordinator, and the process ends.

If the coordinator still has one or more child coordinators, however, then the process returns to box 550, where the coordinator generates and transmits another beacon including information elements indicating the presence of the other root coordinator and including a notice of absence. The process steps represented in boxes 550, 555 and 560 may continue until each of the child coordinators of the coordinator has synchronized with the other root coordinator or another coordinator of the other synchronized wireless network, and has connected to the other synchronized wireless network.

Referring to FIGS. 6A through 6D, views of aspects of one system for detecting or merging synchronized wireless networks in accordance with implementations of the present disclosure is shown. Except where otherwise noted, reference numerals preceded by the number "6" in FIGS. 6A through 6D refer to elements that are similar to elements having reference numerals preceded by the number "3" in FIG. 3, by the number "2" in FIG. 2 or by the number "1" shown in FIGS. 1A through 1I.

Figure 6A:
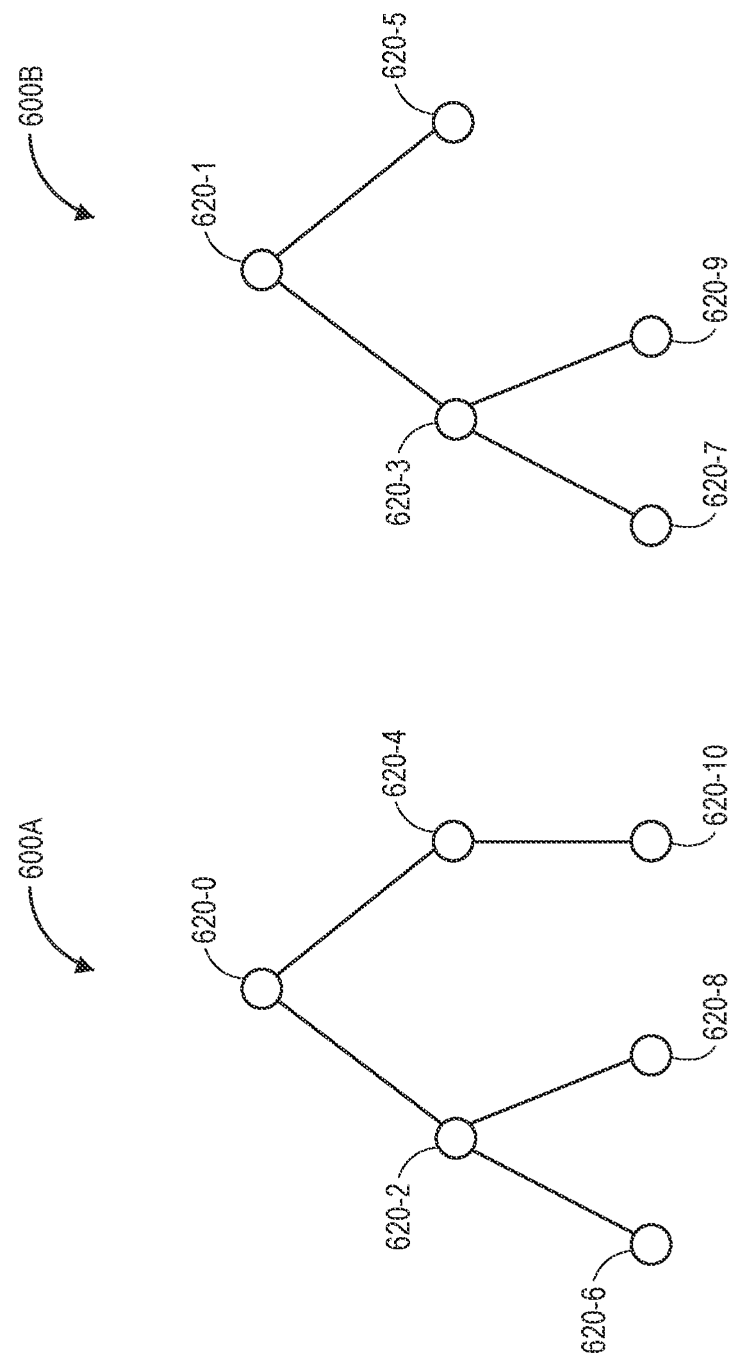
FIGS. 6A through 6D are views of aspects of one system for detecting or merging synchronized wireless networks in accordance with implementations of the present disclosure.

As is shown in FIG. 6A, synchronization trees for a pair of synchronized wireless networks 600A, 600B are shown. Each of the synchronized wireless networks 600A, 600B includes a plurality of coordinators synchronized thereto. For example, the synchronized wireless network 600A includes a root coordinator 620-0 and a pair of coordinator nodes 620-2, 620-4 synchronized with the root coordinator 620-0, along with a pair of coordinator nodes 620-6, 620-8 synchronized with the coordinator node 620-2, and a coordinator node 620-10 synchronized with the coordinator node 620-4. The synchronized wireless network 600B includes a root coordinator 620-1 and a pair of coordinator nodes 620-3, 620-5 synchronized with the root coordinator 620-1, as well as a pair of coordinator nodes 620-7, 620-9 synchronized with the coordinator node 620-3. Each of the synchronized wireless networks 600A, 600B may further include any number of other devices or systems (e.g., "leaf nodes"), such as cameras or imaging devices but also load sensors, electronic shelf labels, cash registers, climate control devices, remote power switches, gate sensors, turnstiles, pedestals, security cameras, RFID transmitters or receivers, motion sensors, computer devices or systems, proximity sensors, lighting components, or any other devices or systems (not shown), which may be connected to and synchronized with any of the coordinator nodes 620-2 through 620-10 according to the IEEE 802.15.4 family of protocols, standards or specifications, or any other protocol, standard or specification.

Devices or systems of the synchronized wireless networks 600A, 600B may detect the presence of one another upon capturing beacons transmitted by root coordinators or other coordinators of the other network. Thus, in the event that the root coordinator 620-1 detected the synchronized wireless network 600A based on a beacon received from the root coordinator 620-0, the root coordinator 620-1 could synchronize with the root coordinator 620-0, and thereby join the synchronized wireless network 600A. However, synchronizing with the root coordinator 620-0 with the synchronized wireless network 600B in the form shown in FIG. 6A would merely cause the synchronized wireless network 600B to lose its root coordinator, thereby forcing either of the coordinator nodes 620-3, 620-5 to become a root coordinator of the synchronized wireless network 600B, and would not resolve any problems posed by the pair of synchronized wireless networks 600A, 600B operating within proximity of one another. Alternatively, both of the coordinator nodes 620-3, 620-5 could, theoretically, attempt to become root coordinators, compounding such problems by creating not one but two synchronized wireless networks in addition to the synchronized wireless network 600A.

Therefore, in accordance with implementations of the present disclosure, upon detecting one another, the synchronized wireless networks 600A, 600B may merge with one another in an orderly fashion that considers levels of priority of the synchronized wireless networks 600A, 600B and numbers of coordinator nodes synchronized to the one of the root coordinators having a lowest level of priority. For example, each of the root coordinators 620-0, 620-1 may randomly scan each of the channels of a communication schedule for a predetermined period of time to determine whether any beacons are detected within such channels. The predetermined period of time may be defined based on a number of timeslots within each channel and a duration of each of the timeslots, and a total duration of the scanning may be determined based on the number of channels to be scanned.

When each of the root coordinators 620-0, 620-1 detects the other of the root coordinators 620-0, 620-1, e.g., based on beacons transmitted thereby, one of the root coordinators 620-0, 620-1 having a highest level of priority may be determined based on such beacons. For example, each of the beacons transmitted by the root coordinators 620-0, 620-1 may include an information element representing an absolute slot number, or a total number of timeslots elapsed since the respective synchronized wireless networks 600A, 600B were initially deployed. The absolute slot numbers represented in such beacons thus indicate ages of the respective synchronized wireless networks 600A, 600B. An oldest one of the synchronized wireless networks 600A, 600B, or one of the synchronized wireless networks 600A, 600B having a highest level of priority, may thus be identified based on the absolute slot numbers represented in such beacons. Alternatively, a highest level of priority of a detected synchronized wireless network may be determined in any other manner.

For example, where the root coordinator 620-1 detects a beacon of the root coordinator 620-0 and determines that the synchronized wireless network 600A has a higher level of priority, e.g., a greater absolute slot number, a greater number of coordinators synchronized thereto, or a greater number of nodes connected thereto, the root coordinator 620-1 may thus generate and transmit a beacon having an information element with one or more bits or values, e.g., a "multi-trees" bit, indicating that one or more other higher-priority synchronized wireless networks have been detected. Upon receiving the beacon from the root coordinator 620-1, the coordinator nodes 620-3, 620-5, 620-7, 620-9 may further generate and transmit their own beacons, each having an information element with bits or values, e.g., a "multi-trees" bit, indicating that one or more other higher-priority synchronized wireless networks have been detected. For example, the coordinator node 620-3, which includes two coordinator nodes as children, viz., the coordinator nodes 620-7, 620-9, may generate and transmit a beacon including a "multi-trees" bit or another information element indicating that one or more other higher-priority synchronized wireless networks, viz., the synchronized wireless network 600A, has been detected. The coordinator node 620-5, meanwhile, which does not have any coordinator nodes as children, need not transmit a beacon including the "multi-trees" bit or any other such information element.

Figure 6B:
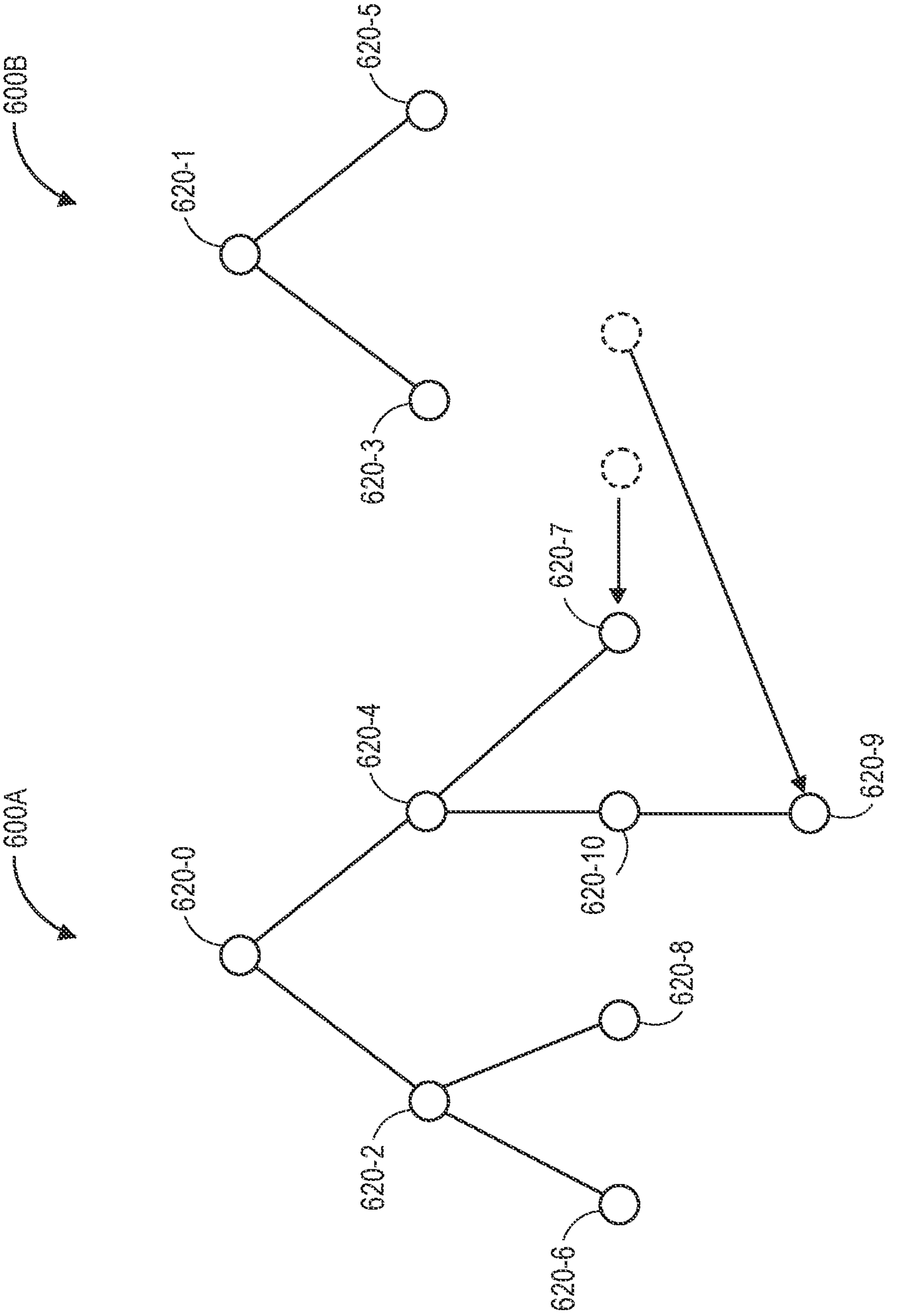

The coordinator nodes 620-3, 620-5, 620-7, 620-9 of the synchronized wireless network 600B may also perform their own scans for other beacons of other coordinators, e.g., root coordinators of other synchronized wireless networks or other coordinators of any synchronized wireless networks, at selected intervals. As is shown in FIG. 6B, after having detected a beacon of the coordinator node 620-3 indicating the presence of the synchronized wireless network 600A, and upon detecting a beacon of the root coordinator 620-0, the coordinator nodes 620-7, 620-9, which do not have any child coordinator nodes, each synchronize with the root coordinator 620-0 and join the synchronized wireless network 600A accordingly. For example, as is shown in FIG. 6B, the coordinator nodes 620-7, 620-9 may select one of the coordinator nodes 620-2, 620-4, 620-6, 620-8, 620-10 of the synchronized wireless network 600A, viz., the coordinator node 620-4 and the coordinator node 620-10, and initiate handshakes with such coordinator nodes by the exchange of one or more packets of information or data. A successfully completed handshake may open up respective communications channels between the coordinator node 620-4 and the coordinator node 620-10 and the coordinator nodes 620-7, 620-9, e.g., in accordance with a communication schedule established by the root coordinator 620-0 or the coordinator nodes 620-4, 620-10. The coordinator nodes 620-7, 620-9 may further complete any number of authentication, authorization or security protocols, as necessary, prior to joining the synchronized wireless network 600A.

After the coordinator nodes 620-7, 620-9 have synchronized with the coordinator nodes 620-4, 620-10 and joined the synchronized wireless network 600A, the synchronized wireless network 600B includes only the root coordinator 620-1, the coordinator nodes 620-3, 620-5, and any other nodes connected thereto (not shown). Meanwhile, the root coordinator 620-1 and the coordinator nodes 620-3, 620-5 may continue to scan for beacons of other coordinators of the same or other synchronized wireless networks, albeit at different intervals. For example, the root coordinator 620-1 and each of the coordinator nodes 620-3, 620-5 may scan for beacons, or for the presence of other synchronized wireless networks, at an interval that is proportional to a number of nodes synchronized therewith, thereby providing a sufficient amount of time for the nodes synchronized therewith to detect the presence of the synchronized wireless network 600A, to select one of the coordinator nodes of the synchronized wireless network 600A, and to synchronize with the selected one of the coordinator nodes.

Figure 6C:
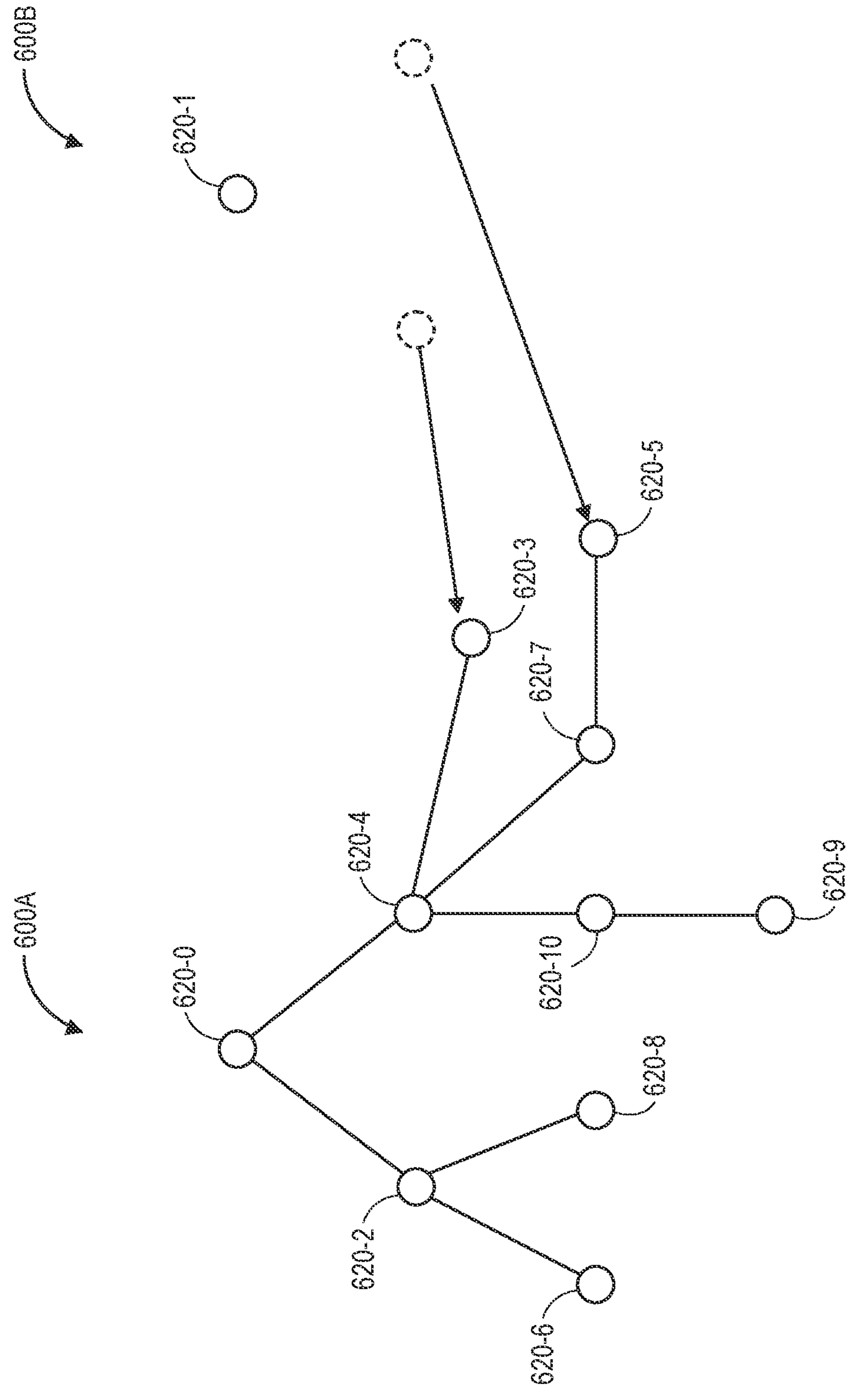

As is shown in FIG. 6C, the coordinator node 620-3, which no longer has any child coordinator nodes, and the coordinator node 620-5, which did not have any child coordinator nodes, may also synchronize with the root coordinator 620-0 or a selected one of the coordinator nodes of the synchronized wireless network 600A. For example, as is shown in FIG. 6C, the coordinator node 620-3 may synchronize with the coordinator node 620-4, and complete any number of authentication, authorization or security protocols, as necessary, prior to joining the synchronized wireless network 600A. Once the coordinator node 620-3 has joined the synchronized wireless network 600A, the coordinator node 620-5 may synchronize with the coordinator node 620-7, and complete any number of authentication, authorization or security protocols, as necessary, prior to joining the synchronized wireless network 600A.

After the coordinator nodes 620-3, 620-5 have synchronized with the coordinator nodes 620-4, 620-7 and joined the synchronized wireless network 600A, the synchronized wireless network 600B consists of the root coordinator 620-1, and any other nodes connected thereto (not shown).

Figure 6D:
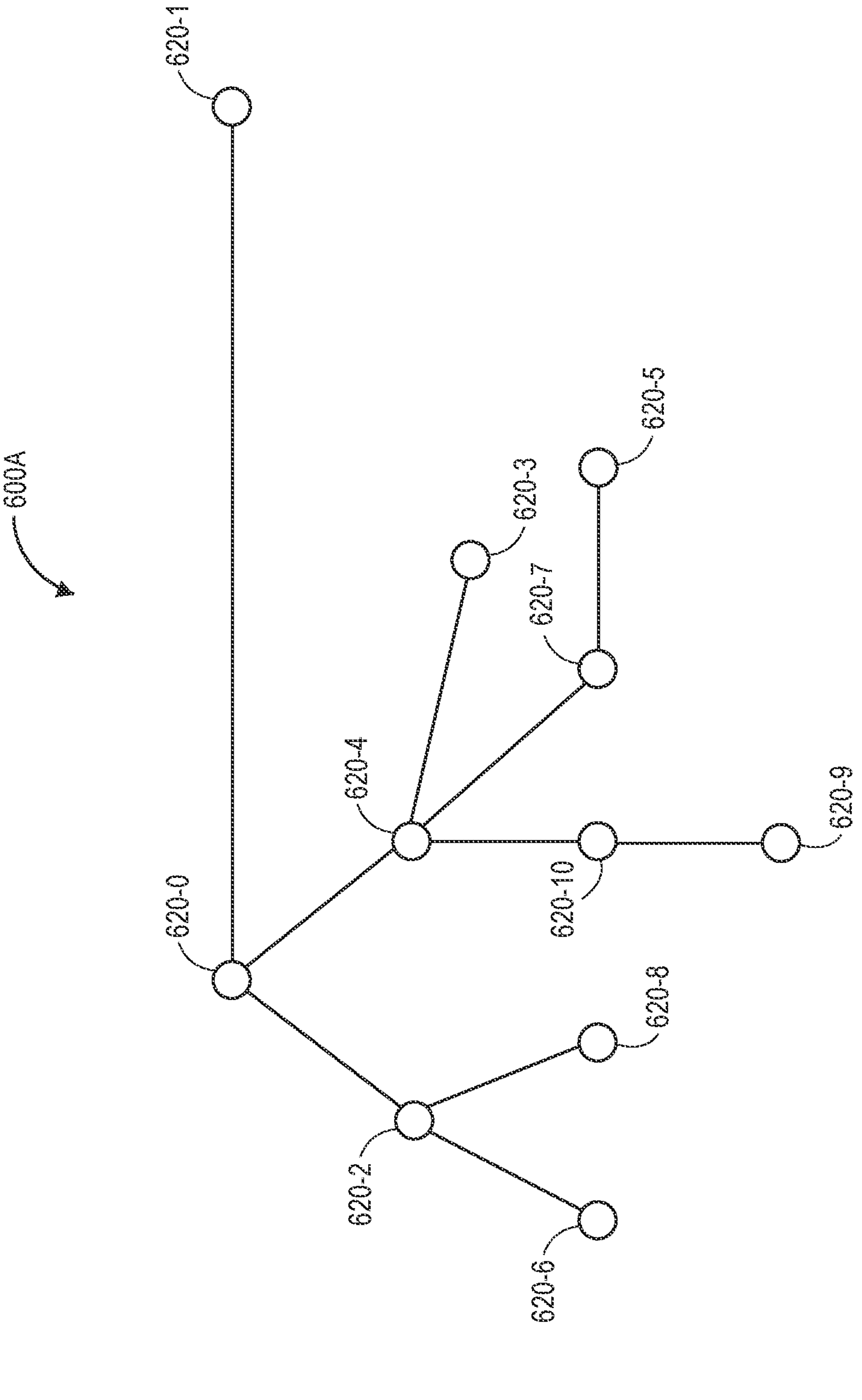

As is shown in FIG. 6D, the root coordinator 620-1, which no longer has any child coordinator nodes, may also synchronize with the root coordinator 620-0 or a selected one of the coordinator nodes of the synchronized wireless network 600A, and become an additional coordinator of that network, e.g., not a root coordinator of that network. For example, as is shown in FIG. 6D, the root coordinator 620-1 may synchronize directly with the root coordinator 620-0, or with any other coordinator node of the synchronized wireless network 600A, and complete any number of authentication, authorization or security protocols, as necessary, prior to joining the synchronized wireless network 600A. Once the root coordinator 620-1 has joined the synchronized wireless network 600A as a coordinator node, the synchronized wireless network 600B no longer exists.

Although FIGS. 6A through 6D show a merger of a pair of synchronized wireless networks 600A, 600B, any number of synchronized wireless networks may be merged in accordance with implementations of the present disclosure. For example, where three or more root coordinators detect the presence of one another, each of the root coordinators may identify a single one of the root coordinators that is a member of a synchronized wireless network having a highest level of priority, e.g., based on an absolute slot number or on any other basis, and merge with that synchronized wireless network in accordance with processes shown in the flow charts of FIGS. 4A and 4B or FIGS. 5A and 5B, or such as is shown in FIGS. 6A through 6D.

Although some implementations of the present disclosure describe the use of area networks to provide network access in various commercial settings, those of ordinary skill in the pertinent arts will realize that the systems and methods of the present disclosure are not so limited. Rather, the systems and methods of the present disclosure may be utilized in connection with any facility where access to networks is desired.

Moreover, those of ordinary skill in the pertinent arts will recognize that nodes of an area network may be any type or form of devices or systems, including not only cameras or imaging devices but also load sensors, electronic shelf labels, cash registers, climate control devices, remote power switches, gate sensors, turnstiles, pedestals, security cameras, RFID transmitters or receivers, motion sensors, computer devices or systems, proximity sensors, lighting components, or any other devices or systems that may be configured to communicate over one or more networks according to any protocol or standard.

Likewise, the data transmitted between nodes of the area networks disclosed herein may include any information or data captured or shared by such nodes during operations, and may but need not include imaging data. For example, where a node of an area network is a load sensor, the node may transmit data representative of changes in loading, indicating that an increase or a decrease in the loading has occurred, or an amount representative of the increase or the decrease.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 4A and 4B and FIGS. 5A and 5B, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:

a first synchronized wireless network including a first plurality of area networks, wherein the first synchronized wireless network comprises a first plurality of coordinator nodes and a first plurality of devices, wherein a first coordinator node of the first plurality of coordinator nodes is a root of the first synchronized wireless network, wherein each of the first plurality of area networks comprises one of a subset of the first plurality of coordinator nodes other than the first coordinator node as a coordinator, and wherein each of the first plurality of devices is associated with one of the first plurality of area networks; and a second synchronized wireless network including a second plurality of area networks, wherein the second synchronized wireless network comprises a second plurality of coordinator nodes and a second plurality of devices, wherein a second coordinator node of the second plurality of coordinator nodes is a root of the second synchronized wireless network, wherein each of the second plurality of area networks comprises one of a subset of the second plurality of coordinator nodes other than the second coordinator node as a coordinator, and wherein each of the second plurality of devices is associated with one of the second plurality of area networks, wherein the first coordinator node is programmed with at least a first set of instructions that, when executed, cause the first coordinator node to at least:

generate a first beacon comprising a first plurality of information elements, wherein the first beacon comprises information regarding a first communication schedule for the first synchronized wireless network; and transmit at least the first beacon at a first interval of time, wherein the second coordinator node is programmed with at least a second set of instructions that, when executed, cause the second coordinator node to at least:

monitor at least one channel of a plurality of channels for a first period of time;

receive at least the first beacon at a first time, wherein the first time is within the first period of time;

determine a first absolute slot number of the first synchronized wireless network based at least in part on the first beacon;

determine that the first absolute slot number is greater than a second absolute slot number of the second synchronized wireless network;

in response to determining that the first absolute slot number is greater than a second absolute slot number of the second synchronized wireless network, generate a second beacon comprising a second plurality of information elements, wherein at least one of the second plurality of information elements comprises a value indicating that the second coordinator node detected a synchronized wireless network having an absolute slot number greater than the second absolute slot number;

transmit the second beacon at a second time, wherein the second time is during a second period of time, and wherein the second synchronized wireless network further comprises at least a third coordinator node at the second time;

determine that the third coordinator node is not synchronized to the second coordinator node at a third time, wherein the third time follows the second time;

in response to determining that the third coordinator node is not synchronized to the second coordinator node at the third time, synchronize with at least one of the first plurality of coordinator nodes at a fourth time, wherein the fourth time follows the third time, and wherein the third coordinator node is programmed with at least a third set of instructions that, when executed, cause the third coordinator node to at least:

receive at least the second beacon at a fifth time; and synchronize with at least one of the first plurality of coordinator nodes at a sixth time, wherein the sixth time follows the third time and precedes the fourth time.

2. The system of claim 1, wherein the second set of instructions, when executed, further cause the second coordinator node to at least:

monitor each of a plurality of timeslots in each of the plurality of channels for at least the first period of time, wherein the first period of time is not less than a duration of one of the plurality of timeslots and not greater than a product of a number of the plurality of channels, a number of the plurality of timeslots, and the duration of the one of the plurality of timeslots.

3. The system of claim 1, wherein each of the first beacon and the second beacon is generated in accordance with a medium access control protocol according to IEEE 802.15.4.

4. The system of claim 1, wherein the value is a binary value of a synchronization control field of at least one of the second plurality of information elements indicating that the second coordinator node has detected at least one synchronized wireless network having a level of priority higher than a level of priority of the second synchronized wireless network.

5. The system of claim 1, wherein each of the first plurality of devices is one of:

an antenna;

a camera;

a cash register;

a climate control system;

a computer system;

a gate sensor;

an electronic label configured to display at least one of an identifier of at least one item or a price of the at least one item;

a light;

a load sensor;

a motion sensor;
a power switch;
a proximity sensor;
a radiofrequency identification transmitter or receiver; or
a turnstile.

6. A method comprising:

transmitting, by a first coordinator node of a first synchronized wireless network, a first beacon comprising a first plurality of information elements, wherein the first beacon comprises information regarding a first communication schedule for the first synchronized wireless network, wherein the first communication schedule comprises a plurality of timeslots in a plurality of channels, and wherein the first beacon is transmitted within a first timeslot of the first communication schedule at a first interval;

monitoring, by a second coordinator node of a second synchronized wireless network, at least one channel of the plurality of channels for a first period of time;

capturing, by the second coordinator node, the first beacon during at least the first period of time;

determining, by the second coordinator node, that a level of priority of the first synchronized wireless network is higher than a level of priority of the second synchronized wireless network;

in response to determining that the level of priority of the first synchronized wireless network is higher than the level of priority of the second synchronized wireless network, transmitting, by the second coordinator node, a second beacon comprising a second plurality of information elements, wherein at least one of the second plurality of information elements comprises a value indicating that the second coordinator node has detected at least one synchronized wireless network having a level of priority higher than the level of priority of the second synchronized wireless network; and monitoring, by the second coordinator node, at least one channel of the plurality of channels for a second period of time, wherein the second period of time is greater than the first period of time;

receiving, by a third coordinator node of the second synchronized wireless network, the second beacon from the second coordinator node, wherein the third coordinator node is synchronized with the second coordinator node;

in response to receiving the second beacon, monitoring, by the third coordinator node, at least one channel of the plurality of channels for a third period of time, wherein the third period of time is less than the second period of time; and receiving, by the third coordinator node, at least the first beacon during at least the third period of time; and in response to receiving the first beacon during at least the third period of time, synchronizing, by the third coordinator node, with a coordinator node of the first synchronized wireless network.

7. The method of claim 6, wherein monitoring the at least one channel of the plurality of channels for the first period of time comprises:

monitoring, by the second coordinator node, each of the plurality of timeslots in each of the plurality of channels for at least the first period of time, wherein the first period of time is not less than a duration of one of the plurality of timeslots and not greater than a product of a number of the plurality of channels, a number of the plurality of timeslots, and the duration of the one of the plurality of timeslots.

8. The method of claim 6, wherein the first period of time is not more than approximately sixty-four seconds.

9. The method of claim 6, wherein determining that the level of priority of the first synchronized wireless network is higher than the level of priority of the second synchronized wireless network comprises:

determining, by the second coordinator node based at least in part on the first beacon, at least one of:

an absolute slot number of the first synchronized wireless network;

a number of coordinator nodes of the first synchronized wireless network; or a number of leaf nodes connected to the first synchronized wireless network;

comparing, by the second coordinator node, the at least one of the absolute slot number of the first synchronized wireless network, the number of coordinator nodes of the first synchronized wireless network or the number of leaf nodes of the first synchronized wireless network to at least one of:

an absolute slot number of the second synchronized wireless network;

a number of coordinator nodes of the second synchronized wireless network; or a number of leaf nodes connected to the second synchronized wireless network.

10. The method of claim 6, wherein the second coordinator node is a coordinator of the second synchronized wireless network during the second period of time.

11. The method of claim 10, wherein the third coordinator node is a coordinator of an area network of the second synchronized wireless network during the second period of time.

12. The method of claim 11, wherein the area network further comprises a plurality of nodes, and wherein each of the plurality of nodes is one of:

an antenna;
a camera;
a cash register;
a climate control system;
a computer system;
a gate sensor;
an electronic label configured to display at least one of an identifier of at least one item or a price of the at least one item;
a light;
a load sensor;
a motion sensor;
a power switch;
a proximity sensor;
a radiofrequency identification transmitter or receiver; or
a turnstile.

13. The method of claim 6, wherein the value is a binary value of a synchronization control field of at least one of the second plurality of information elements indicating that the second coordinator node has detected at least one synchronized wireless network having a level of priority higher than the level of priority of the second synchronized wireless network.

14. The method of claim 6, wherein the second beacon further comprises a value of a synchronization control field of at least one of the second plurality of information elements indicating that the second coordinator node is unavailable to at least receive data frames from any nodes of the second synchronized wireless network.

15. The method of claim 6, wherein each of the first synchronized wireless network and the second synchronized wireless network operates in accordance with a medium access control protocol according to IEEE 802.15.4.

16. The method of claim 6, wherein synchronizing, by the third coordinator node, with the coordinator node of the first synchronized wireless network comprises:

receiving, by the third coordinator node, a plurality of beacons during at least the third period of time, wherein each of the plurality of beacons was transmitted by one of a plurality of coordinator nodes of the first synchronized wireless network; and determining, by the third coordinator node, at least one of:

a signal strength for communication between the third coordinator node and each of the plurality of coordinator nodes of the first synchronized wireless network;

a parent offset of each of the plurality of coordinator nodes of the first synchronized wireless network;

a hop count of each of the plurality of coordinator nodes of the first synchronized wireless network; and a number of nodes connected to each of the plurality of coordinator nodes of the first synchronized wireless network; and selecting one of the plurality of coordinator nodes based at least in part on the signal strength for communication between the third coordinator node and the one of the plurality of coordinator nodes, the parent offset of the one of the plurality of coordinator nodes, the hop count of the one of the plurality of coordinator nodes or the number of nodes connected to the one of the plurality of coordinator nodes, wherein the third coordinator node synchronizes with the selected one of the plurality of coordinator nodes of the first synchronized wireless network.

17. A first coordinator node comprising:

one or more processors;

one or more memory components;

one or more transceivers; and one or more antenna modules, wherein the one or more memory components are programmed with one or more sets of instructions that, when executed by the one or more processors, cause the first coordinator node to execute a method comprising:

monitoring at least one communication channel for at least a first period of time, wherein the first coordinator node is synchronized with a first plurality of nodes of a first synchronized wireless network during the first period of time;

receiving at least a first beacon via the at least one communication channel at a first time during the first period of time, wherein the first beacon comprises a first plurality of information elements;

determining, based at least in part on the first beacon, that the first beacon was transmitted by a second coordinator node, wherein the second coordinator node is a root coordinator of a second synchronized wireless network;

determining, based at least in part on the first beacon, that a level of priority of the second synchronized wireless network is higher than a level of priority of the first synchronized wireless network;

in response to determining that the level of priority of the second synchronized wireless network is higher than the level of priority of the first synchronized wireless network, generating a second beacon comprising a second plurality of information elements, wherein at least one of the second plurality of information elements comprises:

a first value indicating that the first coordinator node has detected at least one synchronized wireless network having a level of priority higher than the level of priority of the first synchronized wireless network; and a second value indicating that the first coordinator node is unavailable to at least receive data frames from any nodes of the first synchronized wireless network;

transmitting the second beacon at a second time, wherein the second time follows the first time;

determining that each of the first plurality of nodes is synchronized with the second synchronized wireless network; and in response to determining that each of the first plurality of nodes is synchronized with the second synchronized wireless network, synchronizing with one of a plurality of coordinators of the second synchronized wireless network.

18. The first coordinator node of claim 17, wherein determining that the level of priority of the second synchronized wireless network is higher than the level of priority of the first synchronized wireless network comprises:

determining an absolute slot number of the second synchronized wireless network based at least in part on the first beacon;

comparing the absolute slot number of the second synchronized wireless network to an absolute slot number of the first synchronized wireless network; and determining that the absolute slot number of the second synchronized wireless network is greater than the absolute slot number of the first synchronized wireless network.

19. The first coordinator node of claim 17, wherein the method further comprises:

receiving a plurality of beacons during at least a first period of time, wherein each of the plurality of beacons was transmitted by one of a plurality of coordinator nodes of the second synchronized wireless network, and wherein the second time is during the first period of time; and determining at least one of:

a signal strength for communication between the first coordinator node and each of the plurality of coordinator nodes of the second synchronized wireless network;

a parent offset of each of the plurality of coordinator nodes of the second synchronized wireless network;

a hop count of each of the plurality of coordinator nodes of the second synchronized wireless network; and a number of nodes connected to each of the plurality of coordinator nodes of the second synchronized wireless network; and selecting one of the plurality of coordinator nodes of the second synchronized wireless network based at least in part on the signal strength for communication between the first coordinator node and the one of the plurality of coordinator nodes, the parent offset of the one of the plurality of coordinator nodes, the hop count of the one of the plurality of coordinator nodes or the number of nodes connected to the one of the plurality of coordinator nodes, wherein synchronizing with the one of the plurality of coordinators of the second synchronized wireless network comprises synchronizing with the selected one of the plurality of coordinator nodes.

20. The first coordinator node of claim 17, wherein each of the first plurality of nodes is one of:

an antenna;

a camera;

a cash register;

a climate control system;

a computer system;

a gate sensor;

an electronic label configured to display at least one of an identifier of at least one item or a price of the at least one item;

a light;

a load sensor;

a motion sensor;

a power switch;

a proximity sensor;

a radiofrequency identification transmitter or receiver; or a turnstile.

* * * * *